United States Patent
Ketireddy et al.

(10) Patent No.: US 10,860,295 B1
(45) Date of Patent: Dec. 8, 2020

(54) AUTOMATED DETECTION OF AMBIGUITIES IN SOFTWARE DESIGN DIAGRAMS

(71) Applicant: Amazon Technologies, Inc., Seattle, WA (US)

(72) Inventors: Raghuveer Ketireddy, Redmond, WA (US); Benjamin Richeson, Seattle, WA (US); Trevor Tonn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 16/238,762

(22) Filed: Jan. 3, 2019

(51) Int. Cl.
*G06F 9/44* (2018.01)
*G06F 8/20* (2018.01)
*G06F 8/35* (2018.01)

(52) U.S. Cl.
CPC . *G06F 8/20* (2013.01); *G06F 8/35* (2013.01)

(58) Field of Classification Search
CPC ..... G06F 8/20; G06F 8/22; G06F 8/24; G06F 8/35
USPC .................................................. 717/105–116
See application file for complete search history.

(56) References Cited

U.S. PATENT DOCUMENTS

| | | | | |
|---|---|---|---|---|
| 5,983,020 | A * | 11/1999 | Sweeney | G06F 8/4435 717/141 |
| 6,505,342 | B1 * | 1/2003 | Hartmann | G06F 11/3688 714/E11.208 |
| 6,681,383 | B1 * | 1/2004 | Pastor | G06F 8/30 717/126 |
| 6,684,384 | B1 * | 1/2004 | Bickerton | G06Q 40/02 717/108 |
| 7,000,219 | B2 * | 2/2006 | Barrett | G06F 8/24 717/107 |
| 7,237,225 | B2 * | 6/2007 | Kompalli | G06F 8/20 717/108 |
| 7,472,374 | B1 * | 12/2008 | Dillman | G06F 8/10 717/102 |
| 7,661,214 | B2 * | 2/2010 | Clark | G09F 1/08 40/538 |

(Continued)

OTHER PUBLICATIONS

Rojas et al, "Automated Detection of Language Issues Affecting Accuracy, Ambiguity and Verifiability in Software Requirements Written in Natural Language", ACM, pp. 100-108 (Year: 2010).*

(Continued)

*Primary Examiner* — Anil Khatri
(74) *Attorney, Agent, or Firm* — Robert C. Kowert; Kowert, Hood, Munyon, Rankin & Goetzel, P.C.

(57) ABSTRACT

Methods, systems, and computer-readable media for automated detection of ambiguities in software design diagrams are disclosed. One or more graphs are determined that represent a plurality of elements of a design diagram. The one or more graphs comprise a plurality of nodes representing components and a plurality of edges representing relationships between the components. An evaluation of the design diagram with respect to one or more rules is initiated by a rules engine. The evaluation is based (at least in part) on traversal of the one or more graphs. Based (at least in part) on the evaluation, one or more flaws are identified in the design diagram. A modified design diagram is generated that represents remediation of at least a portion of the one or more flaws.

20 Claims, 18 Drawing Sheets

(56) References Cited

U.S. PATENT DOCUMENTS

| | | | | |
|---|---|---|---|---|
| 7,698,695 B2* | 4/2010 | Ganesh | ............... | G06F 8/36 717/106 |
| 7,761,858 B2* | 7/2010 | Chang | ............... | G10L 15/1815 717/140 |
| 7,793,257 B2* | 9/2010 | Motoyama | ............... | G06F 8/30 717/106 |
| 7,818,788 B2 | 10/2010 | Meier | | |
| 7,891,003 B2 | 2/2011 | Mir et al. | | |
| 8,037,449 B2* | 10/2011 | Iborra | ............... | G06F 8/35 717/105 |
| 8,055,907 B2* | 11/2011 | Deem | ............... | G06F 9/44 713/187 |
| 8,229,222 B1* | 7/2012 | Silver | ............... | G06K 9/481 382/181 |
| 8,336,024 B2* | 12/2012 | Kannan | ............... | G06F 16/367 717/107 |
| 8,336,025 B1* | 12/2012 | Hosagrahara | ............... | G06F 8/34 717/111 |
| 8,370,798 B2* | 2/2013 | Broadfoot | ............... | G06F 8/10 717/107 |
| 8,544,550 B2* | 10/2013 | Willoughby | ............... | E21B 33/00 166/360 |
| 8,677,313 B2* | 3/2014 | Sharma | ............... | G06F 8/34 715/234 |
| 8,732,838 B2 | 5/2014 | Medvedev et al. | | |
| 8,914,264 B1* | 12/2014 | Hart | ............... | A61B 5/7275 703/6 |
| 8,938,714 B2* | 1/2015 | Hogg | ............... | G06F 8/355 717/110 |
| 9,009,652 B2 | 4/2015 | Huang et al. | | |
| 9,015,011 B2 | 4/2015 | Sarkar et al. | | |
| 9,015,665 B2 | 4/2015 | Kannan et al. | | |
| 9,575,979 B1 | 2/2017 | McClintock et al. | | |
| 9,665,721 B2 | 5/2017 | Artes et al. | | |
| 9,712,551 B2 | 7/2017 | Grubel et al. | | |
| 10,101,972 B1* | 10/2018 | Nelson | ............... | G06F 8/20 |
| 2010/0262949 A1 | 10/2010 | Jacobsen et al. | | |

OTHER PUBLICATIONS

Sabriye et al, "A Framework for Detecting Ambiguity In Software Requirement Specification", IEEE, pp. 209-212 (Year: 2017).*

Caschera et al, "Ambiguity Detection in Multi modal Systems", ACM, pp. 331-334 (Year: 2008).*

Alexe et al, "Muse: Mapping Understanding and deSign by Example", IEEE, pp. 10-19 (Year: 2008).*

Rowen, "Software Project Management Under Incomplete and Ambiguous Specifications", IEEE, 10-21 (Year: 1990).*

Card et al, "An Empirical Study of Software Design Practices", IEEE, pp. 264-271 (Year: 1986).*

Tosanguan et al, "An Approach for Defining Rules as Functions in Rule-Based Software Development", IEEE, pp. 30-34 (Year: 2012).*

Fant, "Building Domain Specific Software Architectures from Software Architectural Design Patterns", ACM, pp. 1152-1154 (Year: 2011).*

Osman et al, "Ambiguous Software Requirement Specification Detection: An Automated Approach", ACM, pp. 33-40 (Year: 2018).*

Darren Pauli, "Mozilla project spits out threat modelling tool for sysadmins," Apr. 2015, theRegister.co.uk. Source: https://www.theregister.co.uk/2015/04/01/mozilla_project_spits_out_sys_admin_threat_modelling_tool/, pp. 1-5.

U.S. Appl. No. 15/996,361, filed Jun. 1, 2018, Rahuveer Ketireddy et al.

U.S. Appl. No. 16/174,092, filed Oct. 29, 2018, Naga Venkata Sunil Alamuri et al.

* cited by examiner

AUTOMATED DETECTION OF AMBIGUITIES IN SOFTWARE DESIGN DIAGRAMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many applications and services that interact with one another in varied ways. For example, a web server may receive requests for web pages and use a complex set of interrelated services to build those requested pages.

Figure 1:
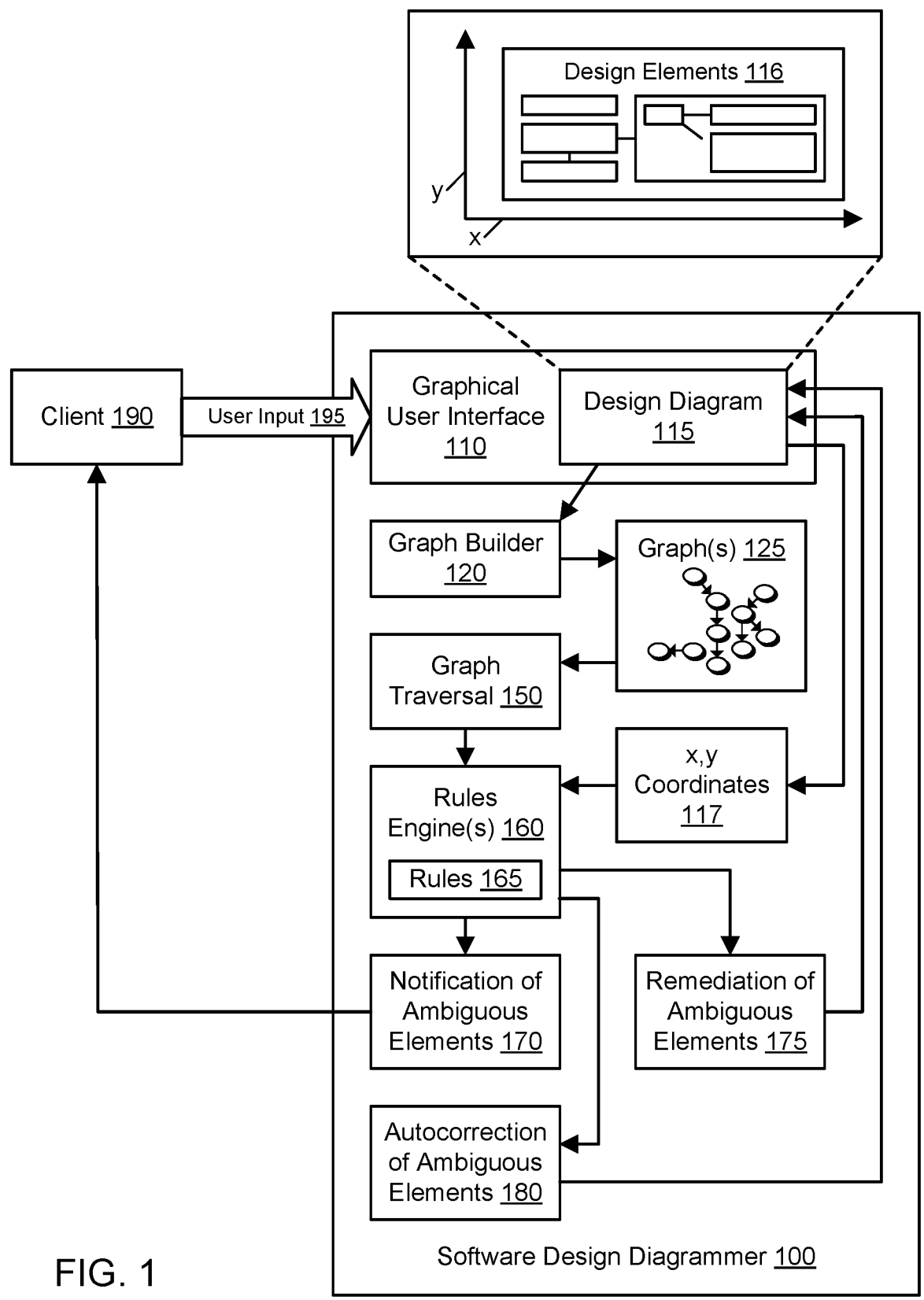
FIG. 1 illustrates an example system environment for automated detection of ambiguities in software design diagrams, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated detection of ambiguities in software design diagrams are described. Software design diagrams may include architecture diagrams, dataflow diagrams, and other types of diagrams that illustrate relationships between software components and resources. User-supplied design diagrams may often contain ambiguities, irregularities, and other flaws that would interfere with automated analysis. For example, components that are intended to interact may be depicted as two neighboring rectangles but without a formal edge between the components to show the direction and nature of their relationship. As another example, a component or edge may lack sufficient configuration information to permit an automated threat analyzer to ascertain whether that portion of the diagram satisfies a security policy. As yet another example, a component that is intended to be decorative and not functional may not be annotated as such. When a design diagram contains such flaws and the flaws are not remediated, a software implementation process based on the diagram may be made more complicated and time-consuming. Additionally, such flaws may reduce the quality of automated analysis of the design diagram (e.g., using one or more analyzers for automated threat analysis, automated analysis of policy compliance, and/or automated performance analysis).

Using the techniques described herein, one or more rules may be evaluated against a design diagram using a rules engine to perform automated identification of ambiguities, irregularities, violations of best practices for software design, and other flaws. Elements of a design diagram may be converted to a graph representation in which nodes (or vertices) represent software components and/or resources and edges represent relationships. The graph representation may include one or more graphs. For example, nodes that lack sufficient edge information in the diagram may be represented as unconnected nodes in the graph representation. The graph representation may be traversed such that every element is evaluated with respect to one or more rules. The evaluation may also use spatial information (e.g., x-y coordinates on a two-dimensional plane) in determining whether rules are matched. For example, a particular rule may be matched to identify an ambiguous relationship between two neighboring components if the components are within a pixel threshold in terms of distance but lacking a formal edge in the graph (and in the original diagram). As another example, a particular rule may be matched to identify an ambiguous relationship between two components that overlap spatially but lack a formal edge in the graph (and in the original diagram). Matched rules may be reported to users in a user interface, e.g., so that users can fix the identified flaws. In some embodiments, automated recommendations for remediation may be generated and presented to users, and a recommended remediation may be performed in response to user input representing acceptance of the recommendation. For example, a formal edge may be inserted to connect the two components that overlap spatially but were not depicted with a connection in the original diagram. In some embodiments, diagram elements that match a rule may be subjected to autocorrection techniques to remediate flaws and improve the quality of the design diagram automatically. For example, for an edge with only one connected endpoint and no components in the vicinity of the unconnected endpoint, the edge may be automatically removed. As another example, if an endpoint of an edge is not connected to any component but is spatially close to a particular component, then the endpoint may be automatically connected to that component.

Using the techniques described herein for automated detection of ambiguities in software design diagrams, the software design process may be improved and may produce software components of a higher quality. Additionally, by providing higher quality design diagrams to additional analyzers (e.g., for automated threat analysis, automated analysis of policy compliance, and/or automated performance analysis), the quality of the additional analysis may be enhanced. As one skilled in the art will appreciate in light of this disclosure, embodiments may be capable of achieving certain technical advantages, including some or all of the following: (1) improving the security of software products by using automated detection and remediation of ambiguities related to security configurations of components in software design diagrams; (2) improving the policy compliance of software products by using automated detection and remediation of ambiguities related to policy compliance of components in software design diagrams; (3) improving the performance of software products by using automated detection and remediation of ambiguities related to performance of components in software design diagrams; (4) improving the accuracy of automated threat analysis of software design diagrams by disambiguating and correcting the diagrams prior to performing the threat analysis; (5) improving the accuracy of automated policy compliance analysis of software design diagrams by disambiguating and correcting the diagrams prior to performing the policy compliance analysis; (6) improving the accuracy of automated performance analysis of software design diagrams by disambiguating and correcting the diagrams prior to performing the performance analysis; and so on.

Automated Detection of Ambiguities in Software Design Diagrams

FIG. 1 illustrates an example system environment for automated detection of ambiguities in software design diagrams, according to some embodiments. A software design diagrammer 100 may be configured to generate design diagrams associated with software products and components of software products. Software products may include executable program code such as applications, services, components of applications, components of services, and so on. The terms "application" and "service" may be used interchangeably herein. Components of software products may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. Design diagrams may represent such components and their relationships as design elements. Design diagrams may include architecture diagrams, dataflow diagrams, sequence diagrams, class diagrams, state machine diagrams, use case diagrams, and so on.

To generate a particular design diagram 115, the design diagrammer 100 may accept user input 195 from a client 190. For example, the user input 195 may represent selection of various design elements 116, placement of the design elements on a two-dimensional (e.g., Cartesian) plane having x and y axes, configuration data and other metadata for design elements, labels and annotations for design elements, and so on. The user input 195 may be entered via a graphical user interface (GUI) 110. The GUI 110 may display a visualization of the design diagram 115. In one embodiment, the GUI 110 may be generated (at least in part) by the design diagrammer 100 and may include conventional GUI elements such as windows, sub-windows or panes, buttons, scrollbars, and so on. The GUI 110 may be configured to solicit the user input 195. In one embodiment, the client 190 may represent a client computing device operated by an end user, and the GUI 110 may be displayed on a display device associated with the client device. Based on user input 195 representing modifications to the design diagram 115, the design diagrammer 100 may generate a modified version of the diagram and display the modified diagram in the GUI 110. Examples of design diagrams are discussed below with reference to FIG. 3 through FIG. 10. In some embodiments, a user may provide a design diagram 115 without necessarily using the GUI 110. For example, the user may scan a hand-drawn diagram to produce a flat image, and the design diagrammer 100 or another component may convert that image into a more complex data structure having discrete design elements 116.

At appropriate points in time, the design diagram 115 may be subjected to evaluation by a rules engine 160 in order to identify design elements that represent ambiguities, irregularities, flaws, violations of best practices, and so on. For example, the rules engine 160 may be invoked when the current version of the diagram 115 is committed by the client 190. As another example, the rules engine 160 may be invoked when the current version of the diagram 115 is auto-saved by the design diagrammer 100. In one embodiment, in order to evaluate the diagram 115 properly, a graph builder 120 may convert the diagram elements 116 to one or more graphs 125. The graph(s) 125 may represent a machine-consumable model of software products, their components, and the relationships between products and components. The graph(s) 125 may then be traversed using graph traversal 150 for evaluation of the rules 165 on an element-by-element basis.

The graph(s) 125 may include a plurality of nodes (or vertices) representing software components and a plurality of edges representing relationships between software components. The nodes and edges may represent the design elements 116. For example, a service may be represented using one node, a storage resource may be represented using another node, and an edge between the two nodes may represent the use of the storage resource by the service for storage and/or retrieval of data. In one embodiment, each of several graphs 125 may represent components of a particular application. In one embodiment, sub-graphs within a graph may represent different functionalities of the application. The edges may include directed edges. In one embodiment, the graph(s) 125 may include directed acyclic graphs. The relationships may include relationships between components of a single application and/or relationships from one application to another application. The graph(s) may capture a complex web of intra-application and inter-application relationships in an enterprise, such that different portions of the graph(s) (sub-graphs) may represent different applications or services. In one embodiment, some portions of the graph(s) 125 may be unconnected to (and unreachable by) other portions of the graph(s), e.g., if the unconnected nodes are not depicted with formal relationships in the design diagram 115.

In one embodiment, the graph(s) 125 may include metadata for individual nodes and edges, and the metadata may indicate unique node identifiers, unique edge identifiers, node types, edge types, and so on. In one embodiment, the graph(s) 125 may include spatial metadata for nodes and edges representing coordinates extracted from the design diagram 115. Using such metadata, each node and/or edge may be uniquely identified in the graph(s) 125. In one embodiment, additional metadata may be stored outside of the graph(s) 125, e.g., in a storage service at a location or key associated with a node or edge in a graph itself. For example, contact information for an owner of a node may be stored external to the graph(s) 115, e.g., in a database or storage service, and such information may be retrievable using a key or other identifier stored within the graph.

Using the component for graph traversal 150, the graph(s) 125 may be traversed for evaluation of the rules 165 by the rules engine(s) 160 on an element-by-element basis. A rules engine may apply one or more rules 165 to metadata associated with elements (nodes and edges) of the graph(s) 126 to determine whether ambiguities, flaws, irregularities, and/or violations of best practices are present in those elements. The terms "ambiguities" and "flaws" may be used interchangeably herein and may also refer to irregularities and violations of best practices. The rules engine(s) 160 may also be referred to as one or more analyzers. To perform the evaluation, the graph(s) 125 may be traversed from one or more root nodes. In one embodiment, a root node may be selected on an arbitrary basis. In one embodiment, a root node may be selected based (at least in part) on the requirements of one or more particular rules. The traversal 150 may keep a record of which nodes and edges have been encountered during the evaluation by the rules engine(s) 160. The traversal 150 may continue until all of the nodes and edges have been evaluated, and so the traversal may be restarted at another root node if one portion of the graph(s) 125 is unconnected to a previously traversed portion. For each node, the rules engine 160 may inspect the properties of the node itself, including the number of edges connected to the node as well as overlap with other nearby nodes in the diagram based on the coordinates (x, y) and area of the nodes. In some embodiments, the graph traversal 150 may be performed by the rules engine(s) 160, or the rules engine(s) may be invoked first and may then invoke the graph traversal functionality to perform the element-by-element evaluation.

The rules engine(s) may attempt to find ambiguities, flaws, irregularities, and/or violations of best practices in the graph(s) 125. Ambiguities and flaws may represent elements whose relationships are unspecified or improperly specified, elements whose configuration information is insufficient to perform analysis of security or policy compliance, elements that are not properly annotated to permit automated analysis of the graph, and so on. For example, a particular rule may be matched to identify an ambiguous relationship between two linked components if the components have a formal edge that lacks metadata regarding a security configuration of the interaction. In one embodiment, one or more of the rules 165 may be applicable to individual graph elements such as nodes and edges. In one embodiment, one or more of the rules 165 may be applicable to sub-graphs having multiple nodes. In one embodiment, one or more of the rules 165 may use path information, e.g., for other nodes encountered prior to the current node during the traversal.

In one embodiment, the rules 165 may take into account the spatial (x,y) coordinates 117 of design elements 116 as depicted in the original diagram 115. For example, a particular rule may be matched to identify an ambiguous relationship between two neighboring components if the components are within a predetermined pixel threshold in terms of distance but lacking a formal edge in the graph(s) 125 (and in the original diagram 115). As another example, a particular rule may be matched to identify an ambiguous relationship between two components that overlap spatially but lack a formal edge in the graph(s) 125 (and in the original diagram 115). In one embodiment, the coordinates 117 may be encoded in the graph(s) 125 as metadata for the nodes and edges. In one embodiment, the coordinates 117 may be maintained apart from the graph(s) 125 and derived from the original diagram 115 for purposes of the evaluation by the rules engine(s) 160.

Based (at least in part) on the evaluation of the design diagram 115 using the rules engine(s) 160, the design diagrammer 100 may generate one or more notifications 170 of the ambiguous elements, flaws, irregularities, and/or violations of best practices. The notification(s) 170 may indicate items such as the identification of the element(s) that matched the rule, the name of the matched rule, a description of the matched rule, any remedial actions that are recommended to correct the problem, and so on. In one embodiment, matched rules may be reported to users in the user interface 110, e.g., so that users can use the notification(s) 170 to manually fix the identified flaws.

Based (at least in part) on the evaluation of the design diagram 115 using the rules engine(s) 160, the design diagrammer 100 may generate one or more remediations 175 of the ambiguous elements, flaws, irregularities, and/or violations of best practices. In some embodiments, automated recommendations for remediation may be generated and presented to users, and a recommended remediation may be performed in response to user input 195 representing acceptance of the recommendation. For example, a formal edge may be inserted to connect the two components that overlap spatially but were not depicted with a connection in the original diagram.

Based (at least in part) on the evaluation of the design diagram 115 using the rules engine(s) 160, the design diagrammer 100 may generate one or more autocorrections 180 of the ambiguous elements, flaws, irregularities, and/or violations of best practices. In some embodiments, elements that match a rule may be subjected to autocorrection techniques to remediate flaws and improve the quality of the design diagram automatically. While at least some of the remediations 175 may be performed in response to user unput, the autocorrections 180 may be performed automatically and programmatically by the design diagrammer 100 and without user input representing acceptance of a recommended action. For example, for an edge with only one connected endpoint and no components in the vicinity of the unconnected endpoint, the edge may be automatically removed. As another example, if an endpoint of an edge is not connected to any component but is spatially close to a particular component, then the endpoint may be automatically connected to that component.

Figure 16:
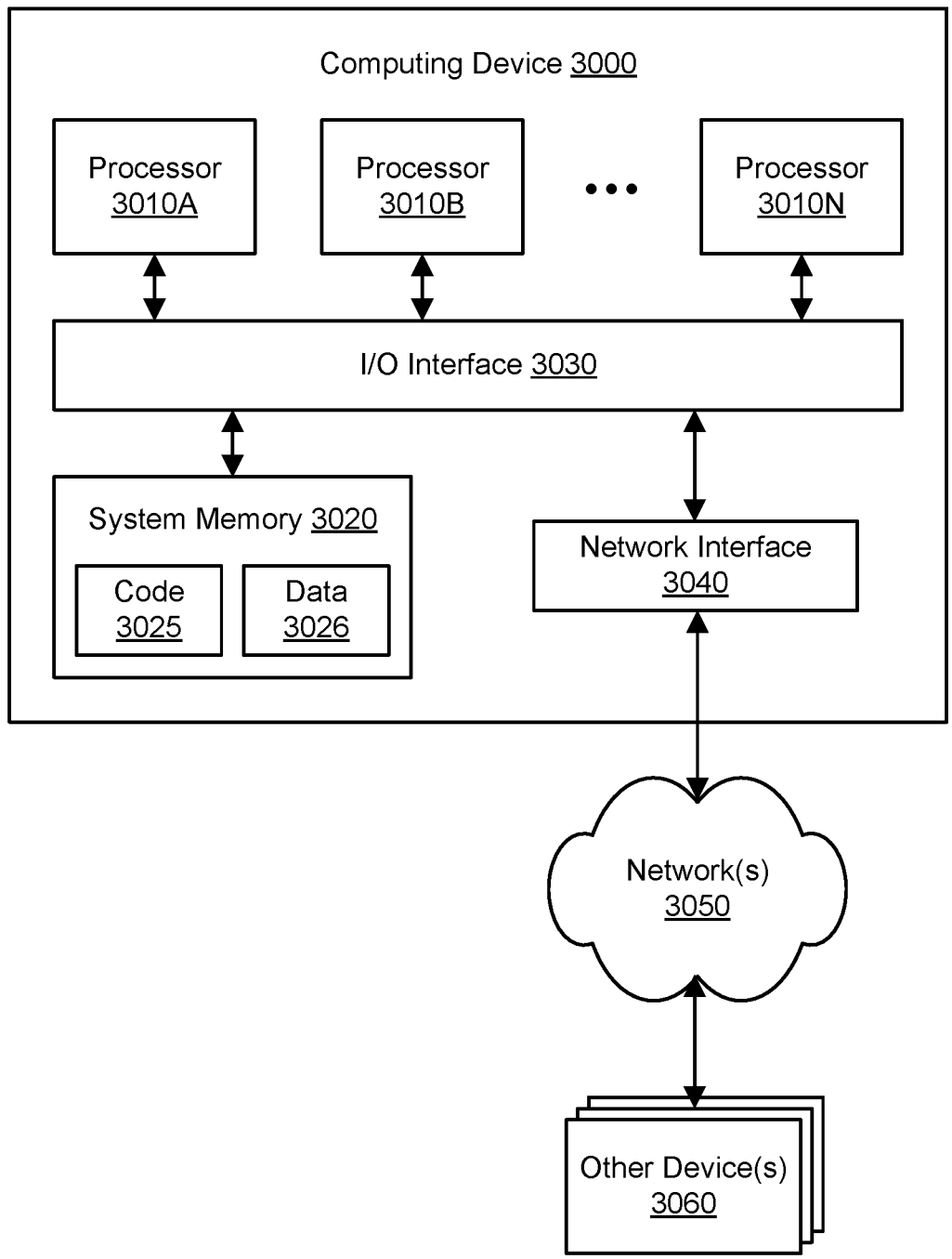
FIG. 16 illustrates an example computing device that may be used in some embodiments.

The software design diagrammer 100 may be implemented using any suitable number and configuration of computing devices, any of which may be implemented by the example computing device 3000 illustrated in FIG. 16. The computing devices may be located in any suitable number of data centers or geographical locations. In various embodiments, at least some of the functionality of the software design diagrammer 100 may be provided by the same computing device or by different computing devices. If any of the components of the software design diagrammer 100 are implemented using different computing devices, then the components and their respective computing devices may be communicatively coupled, e.g., via one or more networks. Each of the components of the software design diagrammer 100 may represent any combination of software and hardware usable to perform their respective functions, as discussed as follows. Operations implemented by the software design diagrammer 100 may be performed automatically, e.g., without a need for user initiation or user intervention after an initial configuration stage, and programmatically, e.g., by execution of program instructions on at least one computing device. It is contemplated that the software design diagrammer 100 may include additional components not shown, fewer components than shown, or different combinations, configurations, or quantities of the components shown.

The software design diagrammer 100 may be implemented in a service-oriented system in which multiple services collaborate according to a service-oriented architecture. In such an environment, the software design diagrammer 100 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the software design diagrammer 100. To enable clients to invoke its functionality, the software design diagrammer 100 may expose any suitable interface(s), such as one or more APIs or other programmatic interfaces and/or graphical user interfaces (GUIs). In one embodiment, the functionality of the software design diagrammer 100 may be offered to clients in exchange for fees.

A computing device associated with the client 190 may convey network-based service requests to the software design diagrammer 100 via one or more networks. In various embodiments, the network(s) may encompass any suitable combination of networking hardware and protocols necessary to establish network-based communications between the client 190 and the software design diagrammer 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both the client 190 and the software design diagrammer 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the client 190 and the Internet as well as between the Internet and the software design diagrammer 100. It is noted that in some embodiments, the client 190 may communicate with the software design diagrammer 100 using a private network rather than the public Internet.

In one embodiment, aspects of the software design diagrammer 100 may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 2:
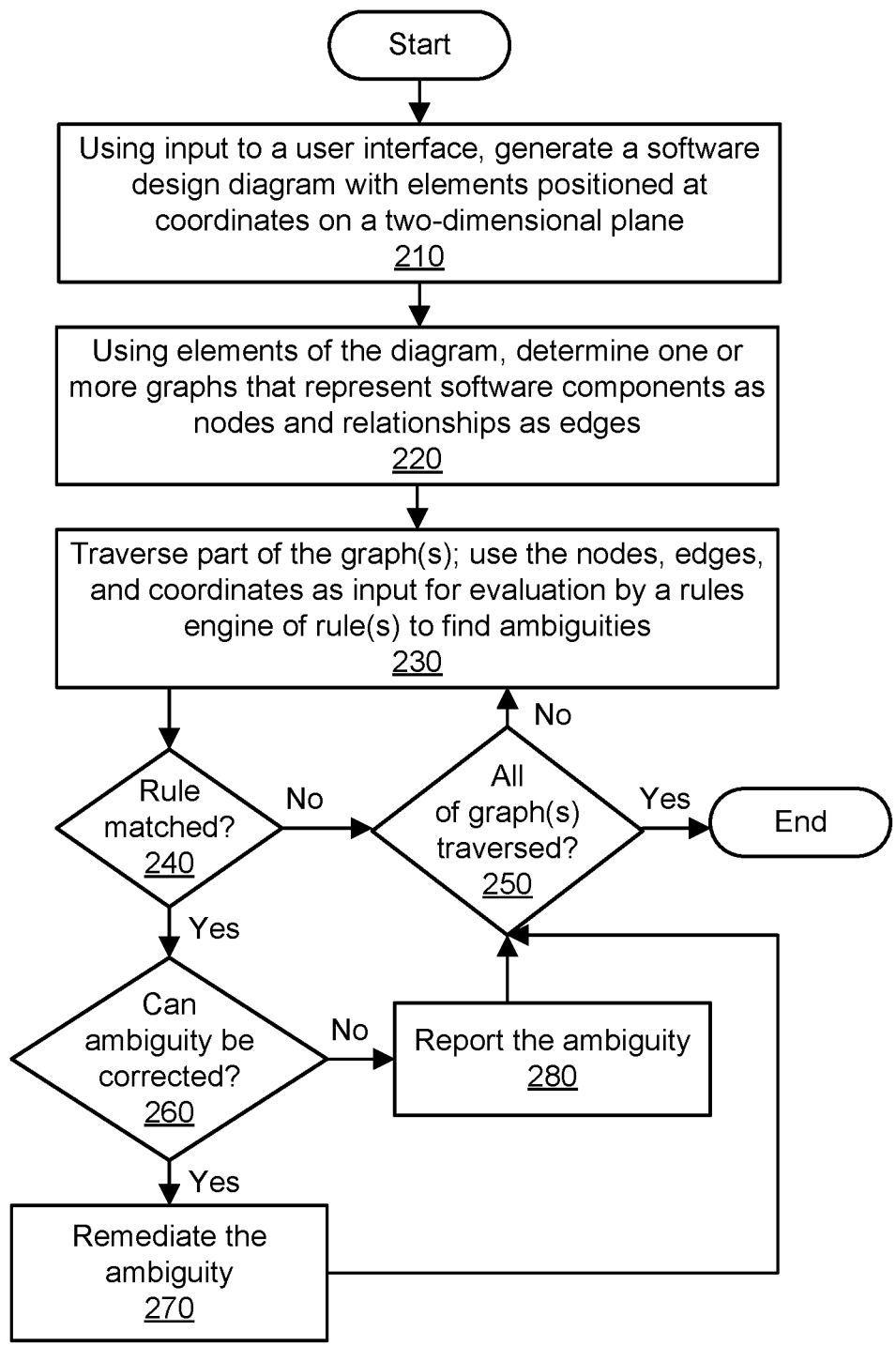
FIG. 2 is a flowchart illustrating a method for automated detection of ambiguities in software design diagrams, according to some embodiments.

FIG. 2 is a flowchart illustrating a method for automated detection of ambiguities in software design diagrams, according to some embodiments. As shown in 210, a software design diagram may be generated using input to a user interface (e.g., a GUI). The diagram may include elements such as software components and their relationships. For example, design diagrams may include architecture diagrams, dataflow diagrams, sequence diagrams, class diagrams, state machine diagrams, use case diagrams, and so on. The elements may be positioned at respective spatial coordinates on a two-dimensional (e.g., Cartesian) plane. For example, one service may be represented in the diagram by a rectangle, and each corner of the rectangle may have its own x and y coordinates. As another example, a connection between two components in the diagram may be represented by a line with two endpoints, each having its own x and y coordinates.

In one embodiment, in order to evaluate the diagram properly using a rules engine, the method may convert the diagram elements to one or more graphs that represent a machine-consumable model of software products, their components, and the relationships between products and components. As shown in 220, one or more graphs may be determined using elements of the diagram. The graph(s) may represent software components as nodes and the relationships between components as edges. For example, a service may be represented using one node, a storage resource may be represented using another node, and an edge between the two nodes may represent the use of the storage resource by the service for storage and/or retrieval of data. In one embodiment, some portions of the graph(s) may be unconnected to (and unreachable by) other portions of the graph(s), e.g., if the unconnected nodes are not depicted with formal relationships in the design diagram.

As shown in 230, at least a portion of the graph(s) may be traversed. During traversal, a rules engine may perform evaluation of nodes and edges to determine if any rules are matched by those elements. The rules may seek to find ambiguities, flaws, irregularities, and/or violations of best practices. Ambiguities and flaws may represent elements whose relationships are unspecified or improperly specified, elements whose configuration information is insufficient to perform analysis of security or policy compliance, elements that are not properly annotated to permit automated analysis of the graph, and so on. For example, a particular rule may be matched to identify an ambiguous relationship between two linked components if the components have a formal edge that lacks metadata regarding a security configuration of the interaction. The rules engine may also use the spatial coordinates as input to the evaluation. For example, a particular rule may be matched to identify an ambiguous relationship between two neighboring components if the components are within a predetermined pixel threshold in terms of distance but lacking a formal edge in the graph(s) (and in the original diagram). To perform the evaluation, the graph(s) may be traversed from one or more root nodes. In one embodiment, a root node may be selected on an arbitrary basis. In one embodiment, a root node may be selected based (at least in part) on the requirements of one or more particular rules. In one embodiment, one or more of the rules may be applicable to individual graph elements such as nodes and edges. In one embodiment, one or more of the rules may be applicable to sub-graphs having multiple nodes. In one embodiment, one or more of the rules may use path information, e.g., for other nodes encountered prior to the current node during the traversal.

As shown in 240, the method may determine whether a rule was matched in the evaluation by the rules engine. If not, then as shown in 250, the method may determine whether all of the elements of the graph(s) have been encountered in the traversal. If so, the method may end. If not, then the traversal may continue as shown in 230.

The matched rule may be associated with one or more remedial actions that, if performed, tend to disambiguate or otherwise improve the quality of the diagram. If a rule was matched, then as shown in 260, the method may determine whether the ambiguity or other flaw can be corrected, e.g., remediated automatically without additional user input or remediated using a recommendation that is accepted by a user. If so, then as shown in 270, one or more remedial actions associated with the matched rule may be performed by the software design diagrammer, potentially without consulting the end user. If the ambiguity or other flaw cannot be corrected, then as shown in 280, the ambiguity or flaw may be reported, e.g., to the end user via a notification in a user interface. In one embodiment, the notification may include a recommendation for one or more remedial actions.

After the ambiguity is reported and/or remediated, the method may continue as shown in 250. The traversal may keep a record of which nodes and edges have been encountered during the evaluation by the rules engine(s). The traversal may continue until all of the nodes and edges have been evaluated, and so the traversal may be restarted at another root node if one portion of the graph(s) is unconnected to a previously traversed portion.

Figure 3:
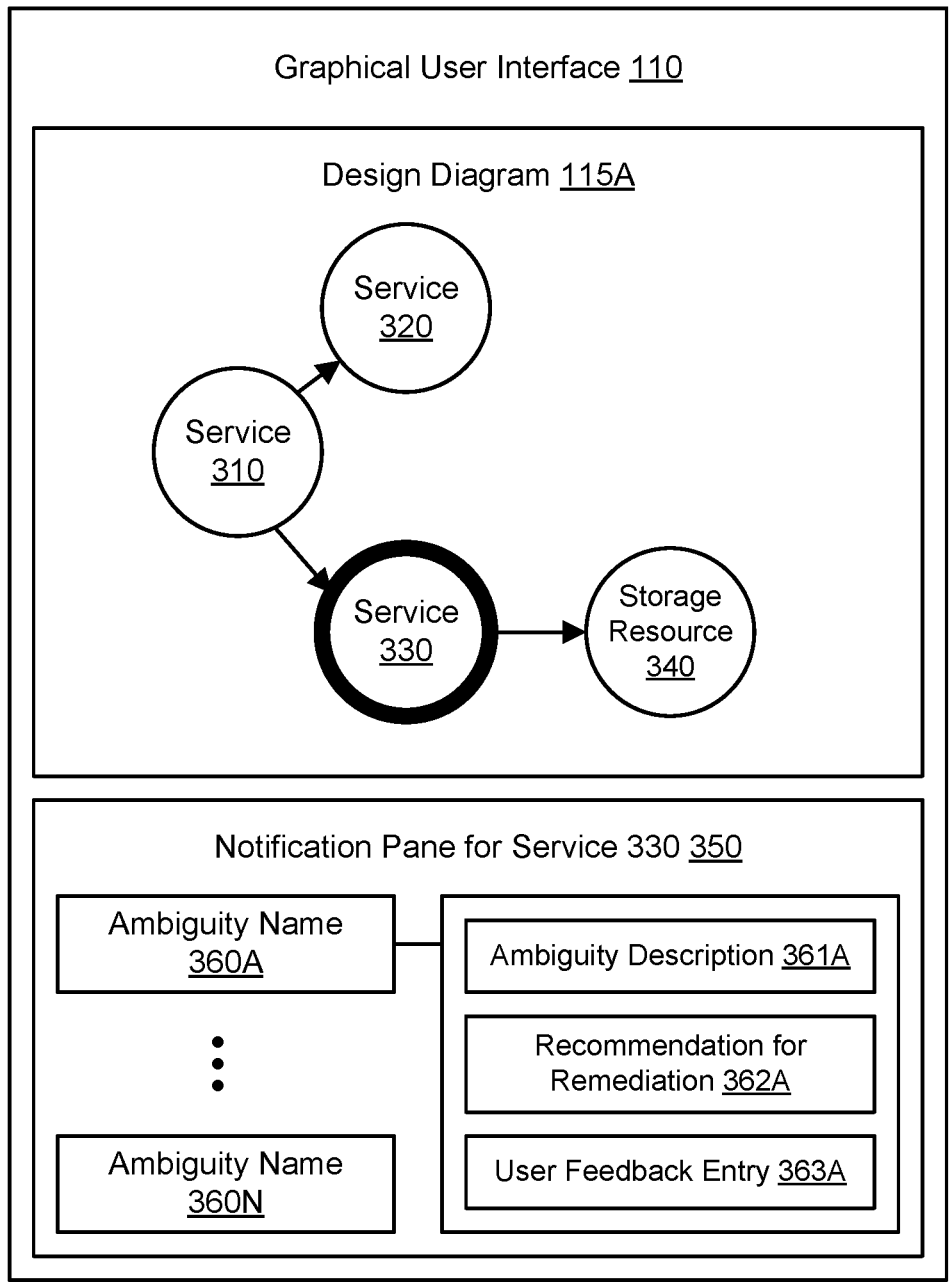
FIG. 3 illustrates further aspects of the example system environment for automated detection of ambiguities in software design diagrams, including a notification pane in a graphical user interface to report ambiguities, according to some embodiments.

FIG. 3 illustrates further aspects of the example system environment for automated detection of ambiguities in software design diagrams, including a notification pane in a graphical user interface to report ambiguities, according to some embodiments. The GUI 110 may present a representation of a particular design diagram 115A. As shown in the example, the diagram 115A may indicate one service 310 with a directed edge to another service 320 and another directed edge to yet another service 330, with the service 330 having another directed edge to a storage resource 340. The GUI 110 may permit an end user to "drill down" to a selected component such as the node representing the service 330. The GUI 110 may include a notification pane 350 associated with the service 330, and the pane may be displayed or populated with information in response to a user's selection of the service 330 in the diagram 115A. The pane may switch from component to component based (at least in part) on user input representing selection of different components in the diagram portion of the GUI 110.

The notification pane 350 may indicate one or more ambiguities, flaws, irregularities, and/or violations of best practices that are associated with the service 330. For example, the pane 350 may list a series of ambiguities by name, from ambiguity 360A to ambiguity 360N. For a given element of the diagram 115A, zero, one, or many ambiguities may be identified and listed. As discussed above, the ambiguities, flaws, irregularities, and/or violations of best practices may be found using the evaluation of the service 330 by the rules engine(s) 160 by finding matches of one or more rules. In one embodiment, the user may obtain further information regarding a particular ambiguity. As shown in the example of FIG. 3, the pane 350 may further display a description 361A of the ambiguity 360A. The description 361A may provide a more detailed explanation of the ambiguity and potentially of the negative consequences of the ambiguity for further analysis of the graph (e.g., for security, policy compliance, and/or performance). As also shown in the example of FIG. 3, the pane 350 may further display a recommendation 362A for remediation of the ambiguity. For example, if the ambiguity 360A relates to an unspecified security configuration of the use of the storage resource 340 by the service 330, then the recommendation 362A may ask the user to provide additional configuration information associated with the service 330 or the edge to the storage resource 340. As further shown in the example of FIG. 3, the pane 350 may further display an interface element for entry of user feedback 363A. In one embodiment, the interface element 363A may permit the user to accept the recommendation for remediation 362A. In one embodiment, the interface element 363A may permit the user to report that the finding of the ambiguity was inaccurate and/or that the finding should be disregarded.

Figure 4:
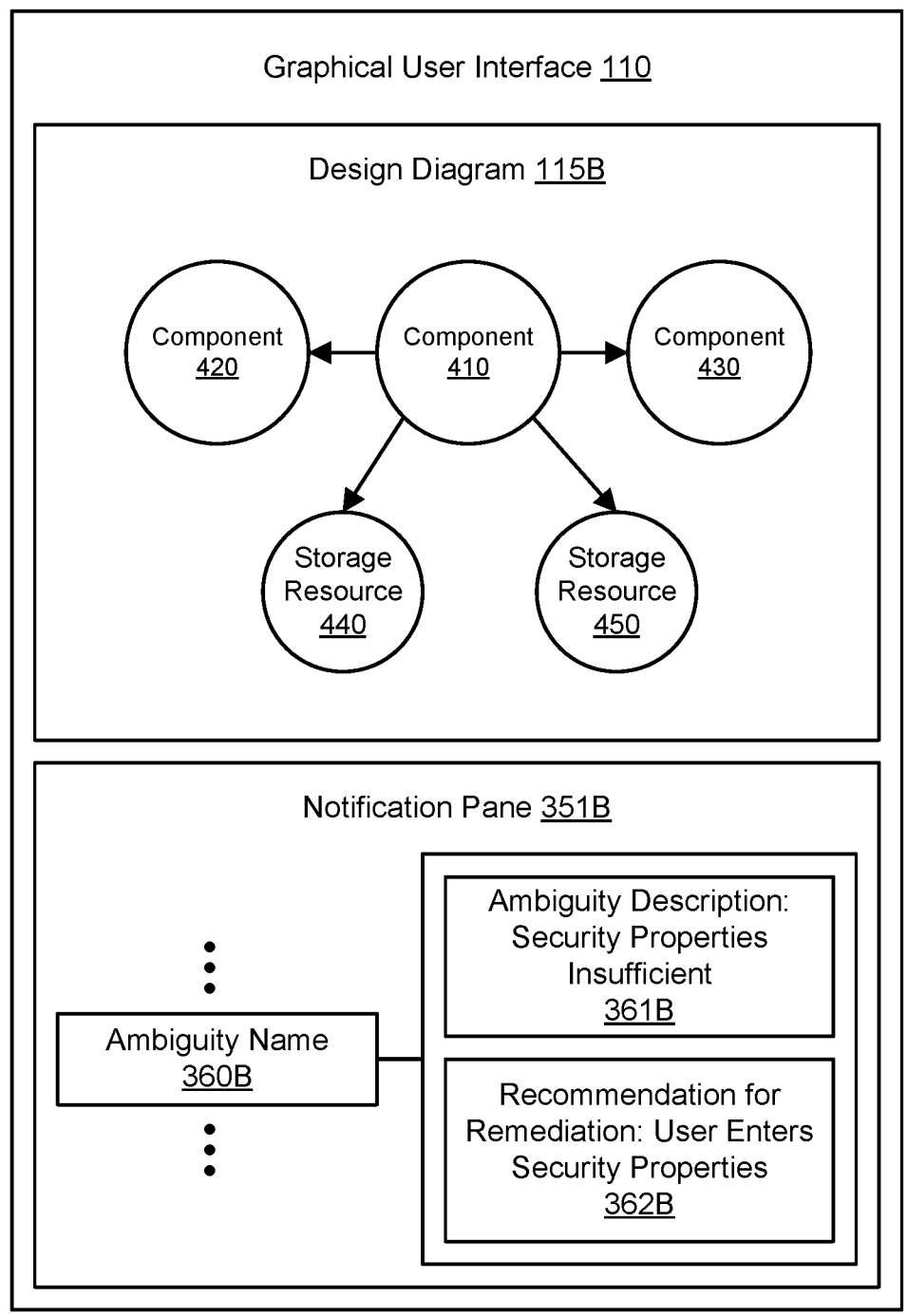
FIG. 4 through FIG. 10 illustrate examples of design ambiguities that may be identified using automated detection and potentially autocorrected, according to some embodiments.

FIG. 4 illustrates an example of a design ambiguity that may be identified using automated detection and potentially autocorrected, according to some embodiments. The GUI 110 may present a representation of a particular design diagram 115B. As shown in the example, the diagram 115B may indicate one component 410 with a directed edge to another component 420, another directed edge to yet another component 430, a directed edge to a storage resource 440, and another directed edge to another storage resource 450. In the notification pane 351B, an ambiguity name 360B associated with one or more elements of the diagram 115B may be displayed. The ambiguity description 361B may indicate that the security properties of the edge between the component 410 and the storage resource 440 are insufficient to perform automated threat analysis. The ambiguity description 361B may also indicate that threat analysis may be inaccurate as long as the ambiguity is not remediated. The recommendation for remediation 362B may indicate that the user should enter appropriate security properties for the relationship.

Figure 5:
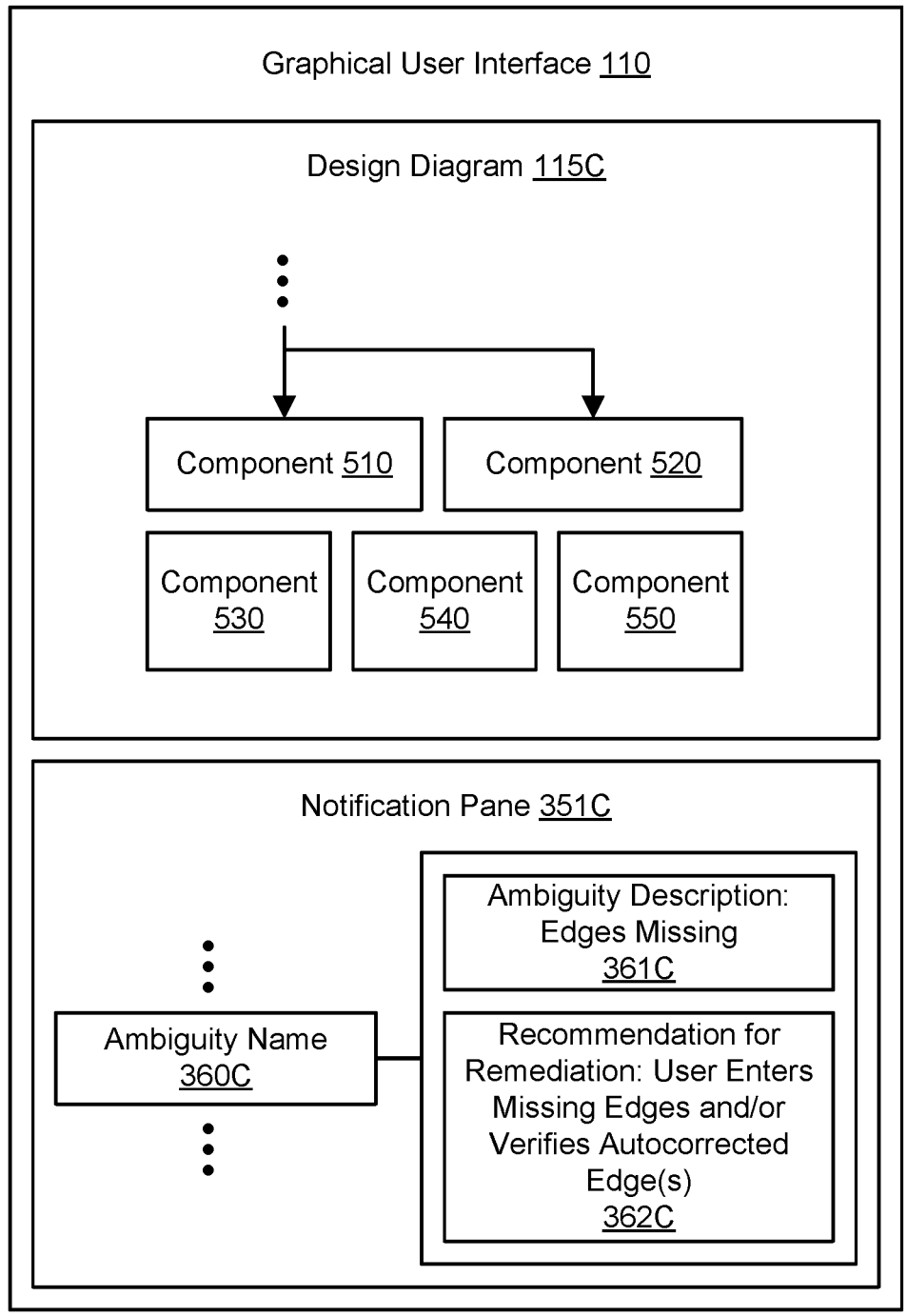

FIG. 5 illustrates an example of a design ambiguity that may be identified using automated detection and potentially autocorrected, according to some embodiments. The GUI 110 may present a representation of a particular design diagram 115C. As shown in the example, the diagram 115C may indicate components 510, 520, 530, 540, and 550 that are positioned near each other according to their respective spatial coordinates but not formally linked by edges. In the notification pane 351C, an ambiguity name 360C associated with one or more elements of the diagram 115C may be displayed. The ambiguity description 361C may indicate that edges are missing in the diagram 361C. The ambiguity description 361C may also indicate that threat analysis or policy compliance analysis may be inaccurate as long as the ambiguity is not remediated. The recommendation for remediation 362C may indicate that the user should specify relationships between the components 510, 520, 530, 540, and 550. In one embodiment, the recommendation 362C may ask the user to verify any autocorrected edges that the diagrammer 110 seeks to insert into the diagram 115C.

Figure 6:
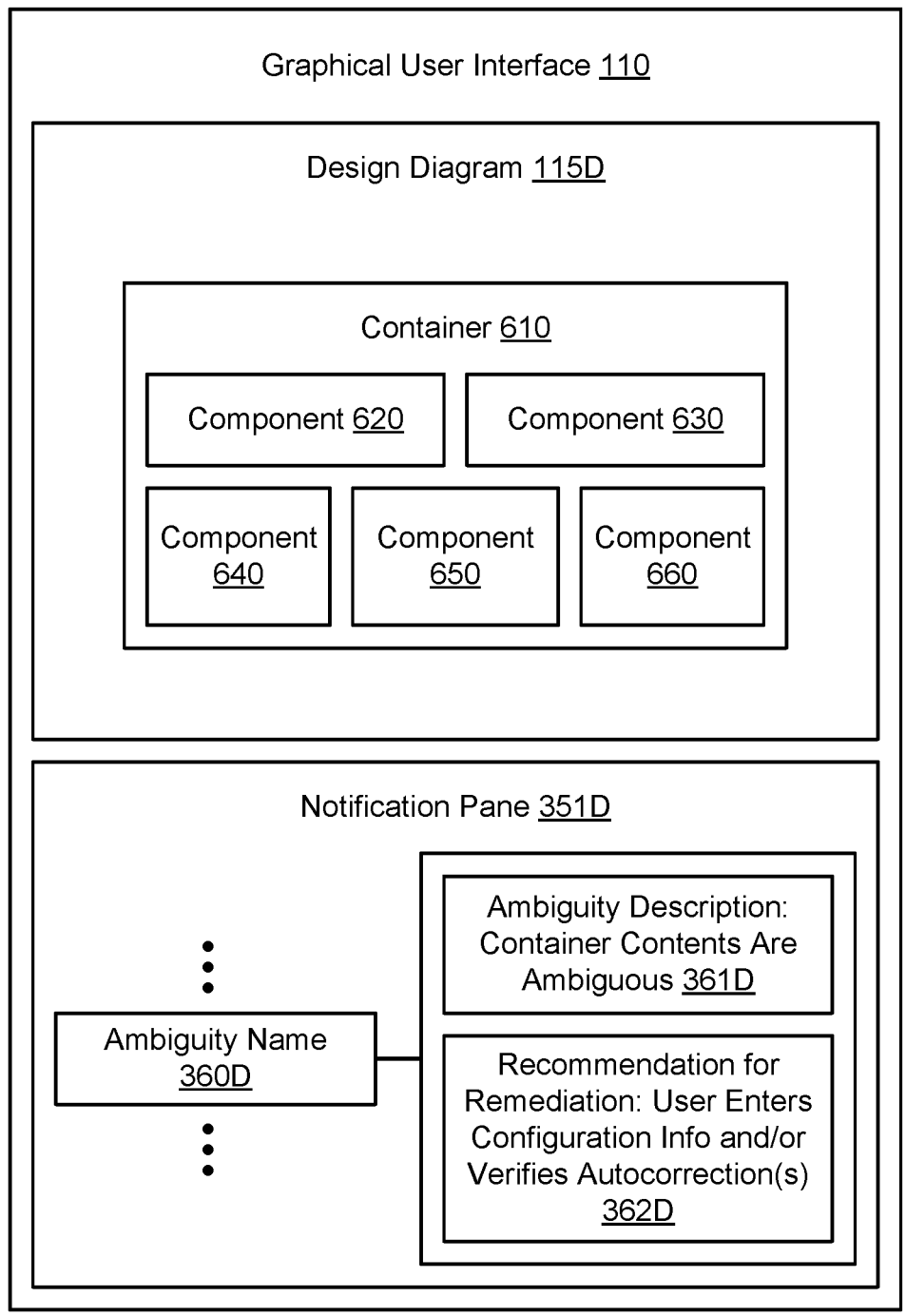

FIG. 6 illustrates an example of a design ambiguity that may be identified using automated detection and potentially autocorrected, according to some embodiments. The GUI 110 may present a representation of a particular design diagram 115D. As shown in the example, the diagram 115D may indicate that components 620, 630, 640, 650, and 660 are positioned within the same container element 610 but are not formally linked by edges. In the notification pane 351D, an ambiguity name 360D associated with one or more elements of the diagram 115D may be displayed. The ambiguity description 361D may indicate that the contents of the container 610 and/or the relationships between those components are ambiguous in the diagram 361D. The ambiguity description 361D may also indicate that threat analysis or policy compliance analysis may be inaccurate as long as the ambiguity is not remediated. The recommendation for remediation 362D may indicate that the user should specify configuration information associated with the components 620-660 and the container 610. The recommendation for remediation 362D may ask the user to state whether any of the components 620-660 can be ignored for purposes of threat analysis and/or policy compliance analysis. In one embodiment, the recommendation 362D may ask the user to verify any autocorrected edges or other configuration information that the diagrammer 110 seeks to insert into the diagram 115D.

Figure 7:
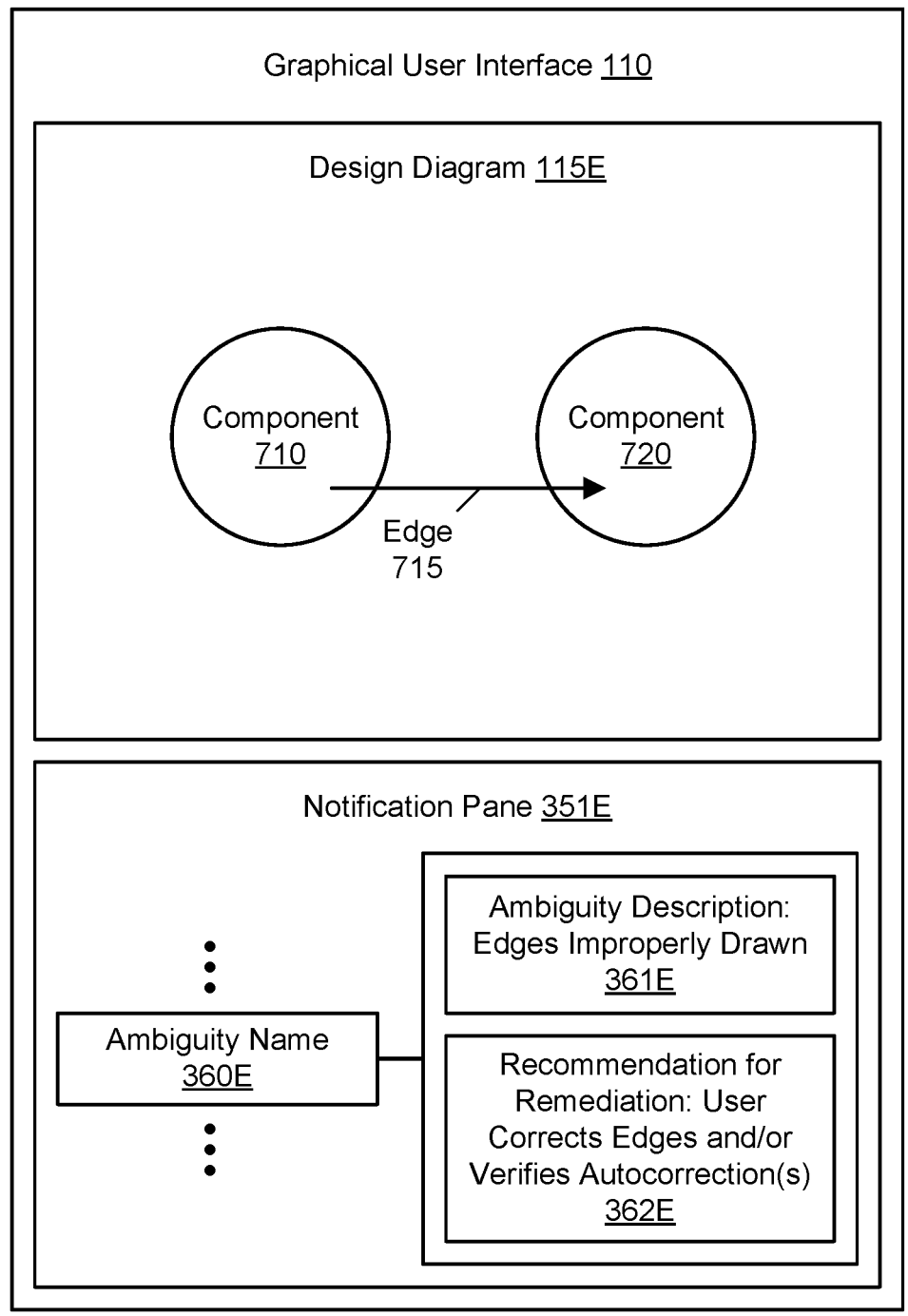

FIG. 7 illustrates an example of a design ambiguity that may be identified using automated detection and potentially autocorrected, according to some embodiments. The GUI 110 may present a representation of a particular design diagram 115E. As shown in the example, the diagram 115E may indicate components 710 and 720 that are positioned near each other and connected with an edge 715 that is improperly drawn. For example, the endpoints of the edge may not be connected to the exterior of the components 710 and 720 but instead loosely positioned at arbitrary locations inside the components. In the notification pane 351E, an ambiguity name 360E associated with one or more elements of the diagram 115E may be displayed. The ambiguity description 361E may indicate that edge 715 is irregular in the diagram 361E. The ambiguity description 361E may also indicate that threat analysis or policy compliance analysis may be inaccurate as long as the ambiguity is not remediated. The recommendation for remediation 362E may indicate that the user should properly connect the edge 715 to the two components 710 and 720. In one embodiment, the recommendation 362E may ask the user to verify any autocorrected edges that the diagrammer 110 seeks to insert into the diagram 115E. In one embodiment, the edge 715 may be autocorrected without the diagrammer 100 seeking user input to verify the remedial action.

Figure 8:
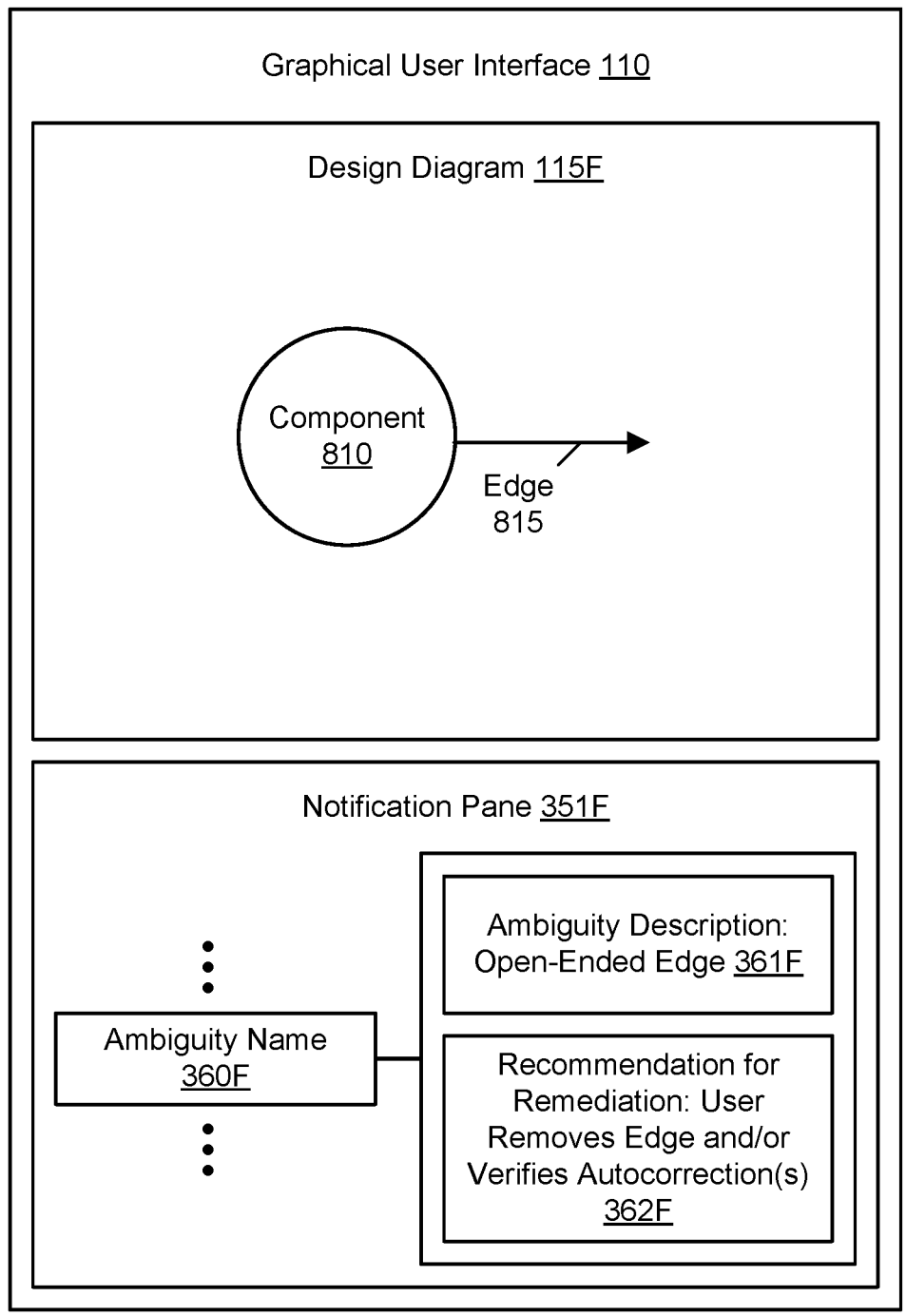

FIG. 8 illustrates an example of a design ambiguity that may be identified using automated detection and potentially autocorrected, according to some embodiments. The GUI 110 may present a representation of a particular design diagram 115F. As shown in the example, the diagram 115F may indicate a component 810 with an edge 815 that has no other component at the other endpoint. In the notification pane 351F, an ambiguity name 360F associated with one or more elements of the diagram 115F may be displayed. The ambiguity description 361F may indicate that edge 815 is improper in the diagram 361F because it points to nothing. The ambiguity description 361F may also indicate that threat analysis or policy compliance analysis may be inaccurate as long as the ambiguity is not remediated. The recommendation for remediation 362F may indicate that the user should remove the edge 815. If another component is spatially close to the unconnected endpoint of the edge 815, then the recommendation 362F may include connecting the edge to that component instead of deleting the edge. In one embodiment, the recommendation 362F may ask the user to verify any autocorrections that the diagrammer 110 seeks to insert into the diagram 115F, e.g., to remove the improper edge 815 or connect it to a nearby component. In one embodiment, the edge 815 may be removed or autocorrected without the diagrammer 100 seeking user input to verify the remedial action.

Figure 9:
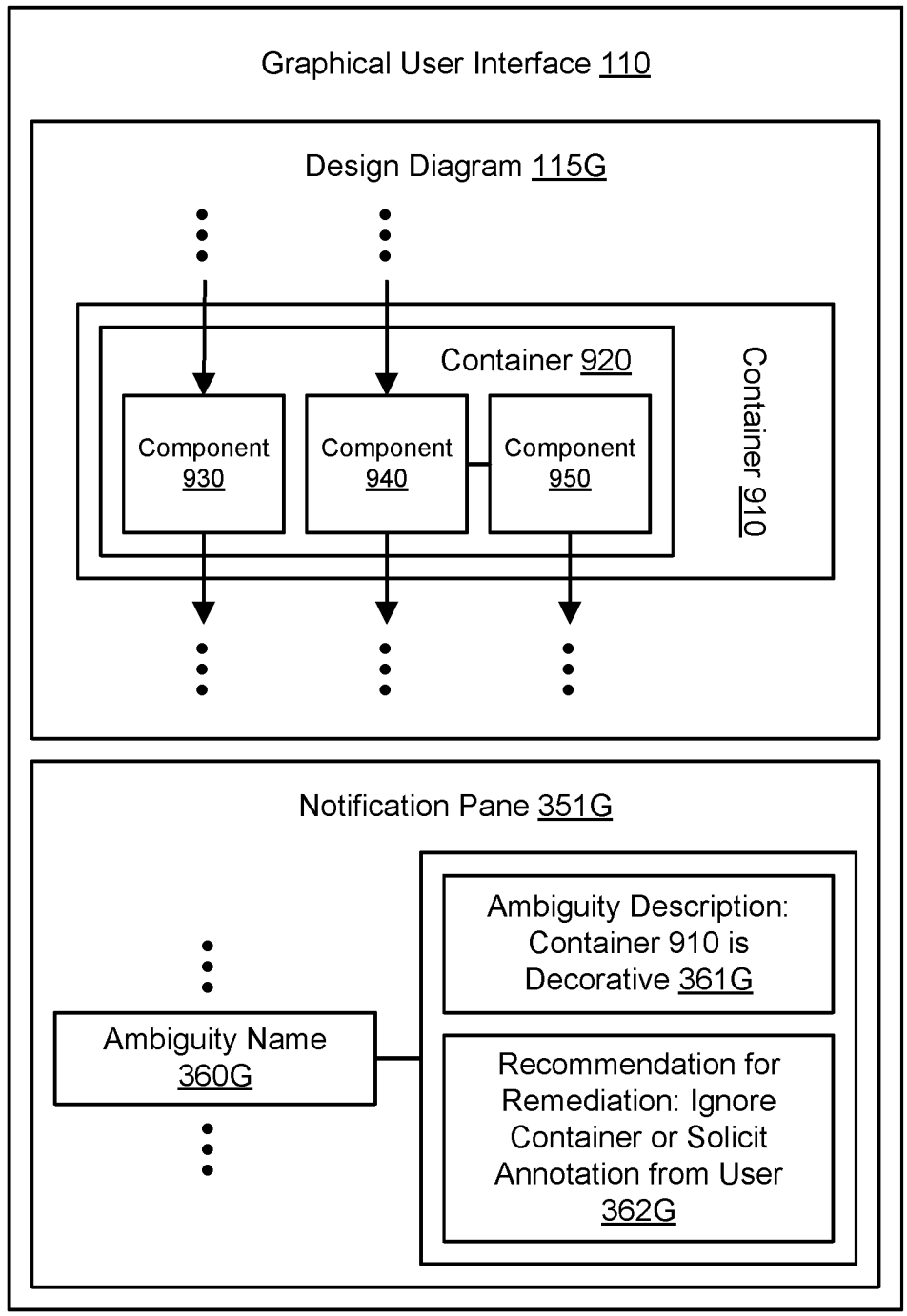

FIG. 9 illustrates an example of a design ambiguity that may be identified using automated detection and potentially autocorrected, according to some embodiments. The GUI 110 may present a representation of a particular design diagram 115G. As shown in the example, the diagram 115G may indicate that components 920, 930, 940, and 950 are positioned within the same container element 920. The diagram 115G may also indicate that the container 920 is positioned within another container 910. In the notification pane 351G, an ambiguity name 360G associated with one or more elements of the diagram 115G may be displayed. The ambiguity description 361G may indicate that the container 910 appears to be decorative and not functional in the diagram 361G. The ambiguity description 361G may also indicate that threat analysis or policy compliance analysis may be inaccurate as long as the ambiguity is not remediated. The recommendation for remediation 362G may indicate that the user should add an annotation to the container 910 to indicate that it is decorative. In one embodiment, the recommendation 362G may ask the user if the container 910 can be ignored for purposes of threat analysis and analysis of policy compliance.

Figure 10:
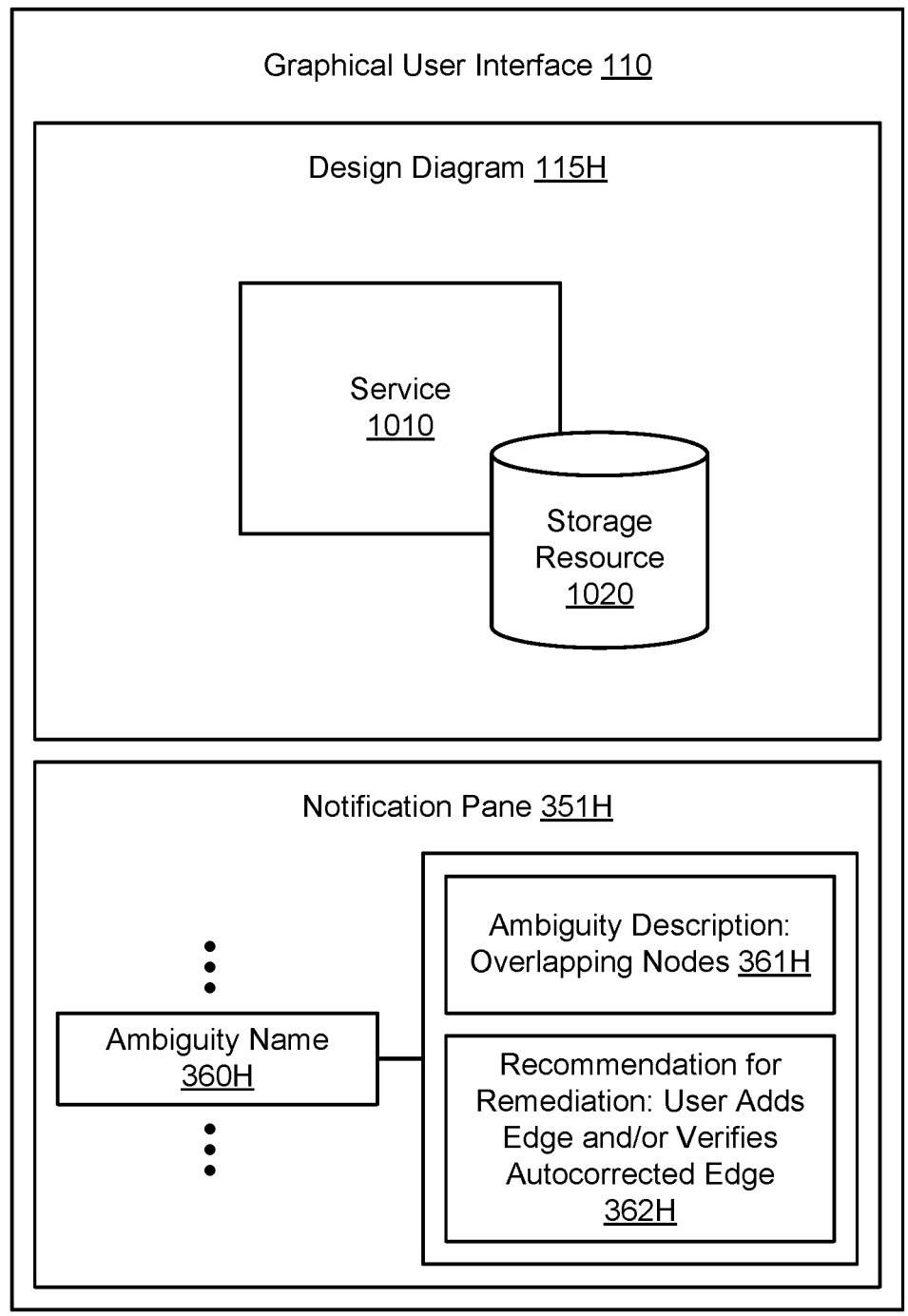

FIG. 10 illustrates an example of a design ambiguity that may be identified using automated detection and potentially autocorrected, according to some embodiments. The GUI 110 may present a representation of a particular design diagram 115H. As shown in the example, the diagram 115H may indicate components 1010 and 1020 that are spatially overlapping but not formally connected with an edge. In the notification pane 351H, an ambiguity name 360H associated with one or more elements of the diagram 115H may be displayed. The ambiguity description 361H may indicate that relationship between the service 1010 and the storage resource 1020 is ambiguous in the diagram 361E. The ambiguity description 361H may also indicate that threat analysis or policy compliance analysis may be inaccurate as long as the ambiguity is not remediated. The recommendation for remediation 362H may indicate that the user should properly connect an edge between the two components 1010 and 1020 and/or add sufficient configuration information for the edge. In one embodiment, the recommendation 362H may ask the user to verify any autocorrected edges that the diagrammer 110 seeks to insert into the diagram 115E. In one embodiment, an edge between the two components 1010 and 1020 may be added via autocorrection without the diagrammer 100 seeking user input to verify the remedial action.

Automated Threat Modeling Using Application Relationships

In some embodiments, graphs derived from the design diagrams discussed above may be used as input to one or more additional rules engines and/or analyzers. For example, the one or more additional rules engines and/or analyzers may analyze graphs or sub-graphs for security, policy compliance, and/or performance. By applying remediation to design diagrams to remove ambiguities and flaws, the accuracy of the analysis by the additional rules engines and/or analyzers may be improved. Using this analysis, potential flaws related to security, policy compliance, and/or performance may be identified and remediated to improve the quality of software components.

Figure 11A:
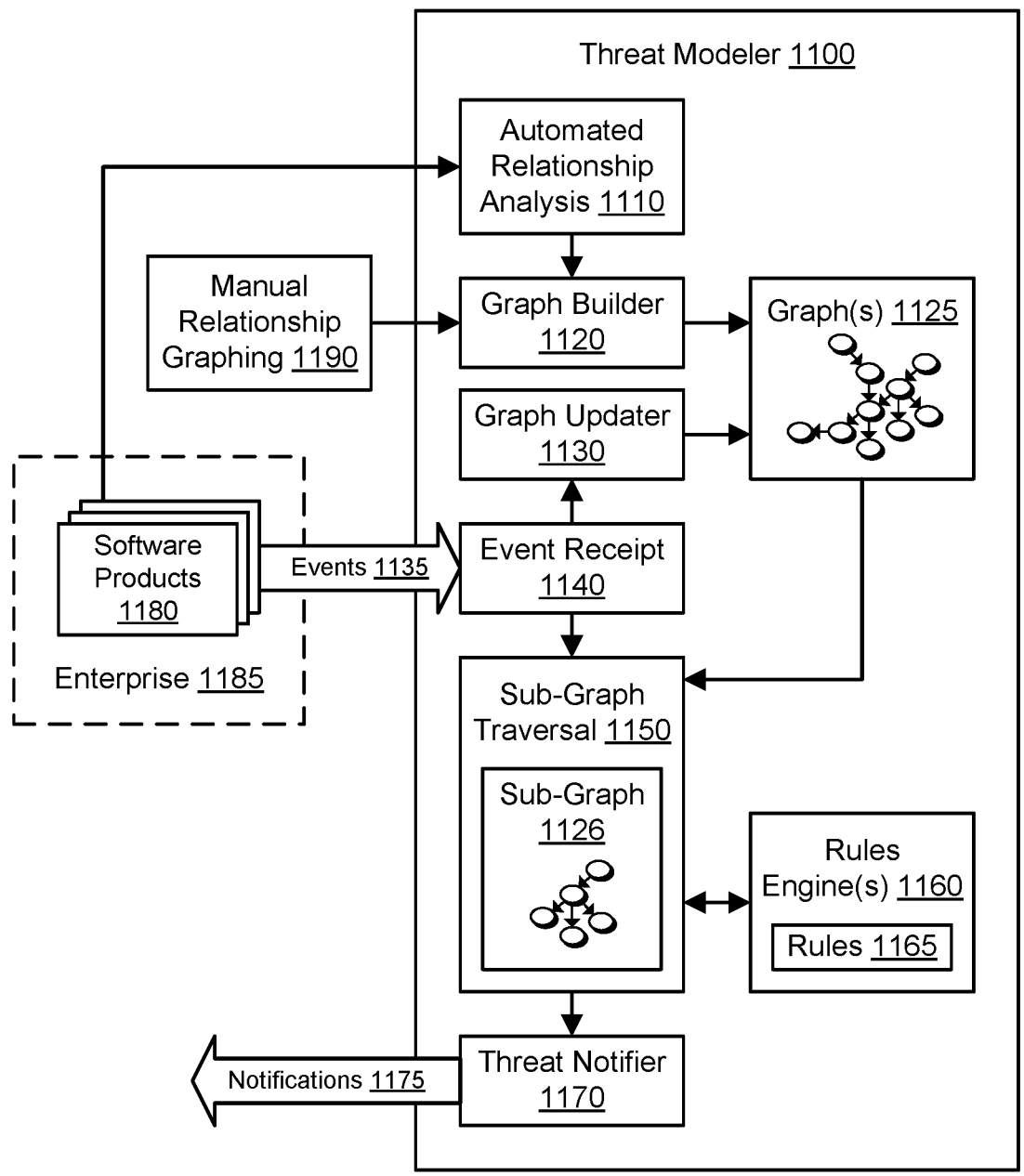
FIG. 11A and FIG. 11B illustrate an example system environment for automated threat modeling using application relationships, according to some embodiments.
Figure 11B:
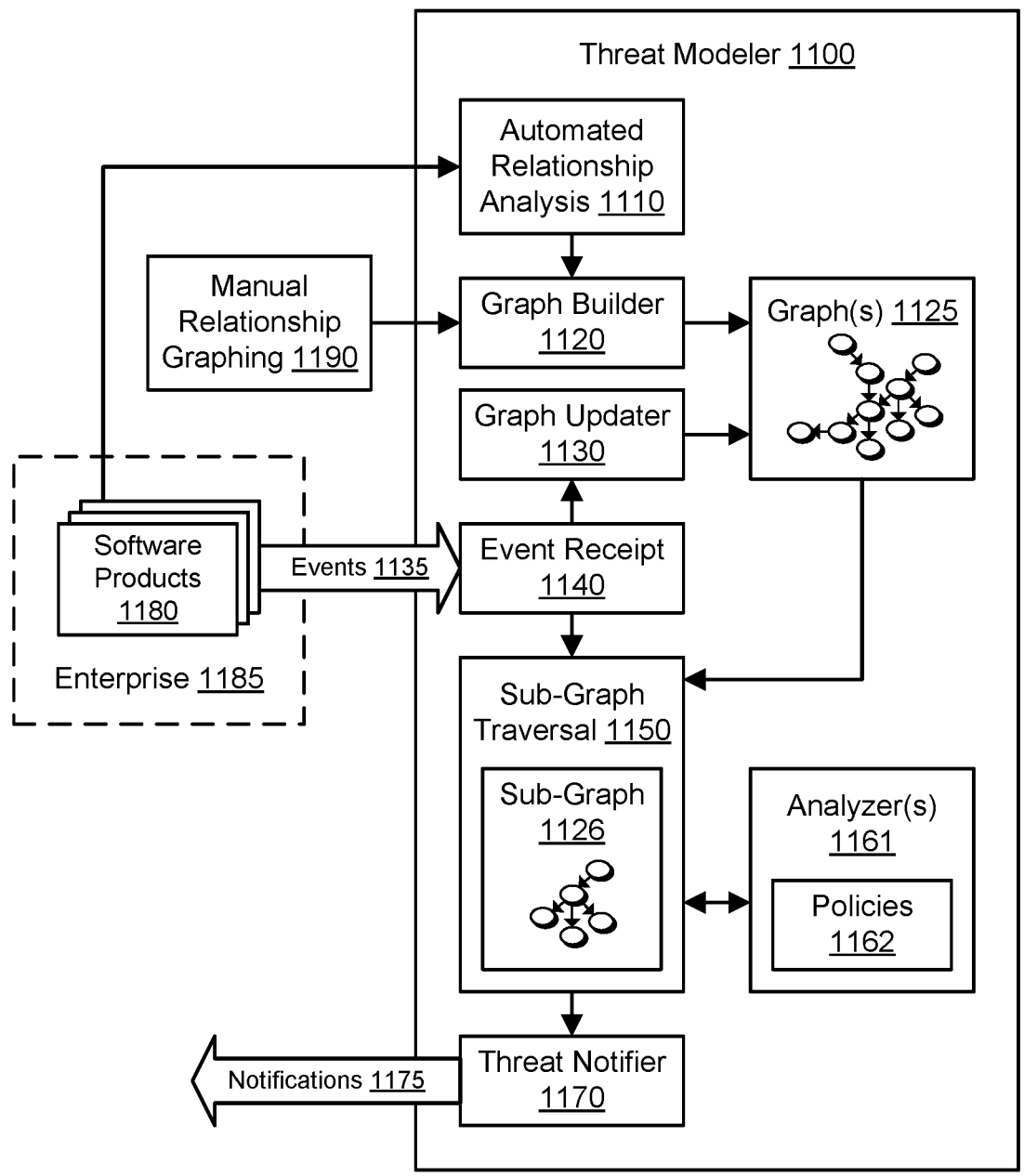

FIG. 11A and FIG. 11B illustrate an example system environment for automated threat modeling using application relationships, according to some embodiments. A threat modeler 1100 may use automated techniques to perform threat modeling for software products 1180. Software products 1180 may include executable program code such as applications, services, components of applications, components of services, and so on. The terms "application" and "service" may be used interchangeably herein. Components of software products 1180 may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. In one embodiment, automated threat modeling may attempt to determine whether software products 1180 comply with applicable policies. The policies may be security-related, and automated threat modeling by the threat modeler 1100 may thus attempt to determine whether security threats, vulnerabilities, or other security-related flaws are present in software products 1180. The policies may also relate to best practices for software development, for identifying availability concerns, for identifying privacy concerns, and so on. In various embodiments, the threat modeler may include various components such as a component for automated relationship analysis 1110, a graph builder 1120, a graph updater 1130, a component for event receipt 1140, a component for subgraph traversal 1150, one or more rules engines 1160, and/or a threat notifier 1170. These components and their operations are discussed as follows.

Using the graph builder 1120, one or more graphs 1125 may be generated. The graph(s) 1125 may include a plurality of nodes representing software components and a plurality of edges representing relationships between software components. In one embodiment, each of many graphs 1125 may represent components of a particular application, and subgraphs within a graph may represent different functionalities of the application. The edges may include directed edges. In one embodiment, the graph(s) 1125 may include directed acyclic graphs. The relationships may include relationships between components of a single application and/or relationships from one application to another application. For example, two connected nodes may represent an application and a storage object in a storage service, and the edge between the nodes may represent that the application stores data in that storage object. The graph(s) may capture a complex web of intra-application and inter-application relationships in an enterprise 1185, such that different portions of the graph(s) (sub-graphs) may represent different applications or services. For a sufficiently large enterprise 1185, an enterprise-wide graph 1125 may include vast numbers of nodes. In one embodiment, some portions of the graph(s) 1125 may be unconnected to (and unreachable by) other portions of the graph(s). The graph(s) 1125 may represent a machine-consumable model of software products 1180, their components, and the relationships between products and components.

In one embodiment, the graph(s) may be built using automated relationship analysis 1110, e.g., using properties of the software products 1180 themselves as input. For example, the automated relationship analysis 1110 may include static code analysis, dynamic (runtime) analysis, and/or metadata acquisition. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph(s) may be built by using one or more ETL (Extract, Transform, Load) tools to extract relevant metadata from services or subsystems associated with the software products 1180 and then using that extracted metadata to generate particular elements of the graph. For example, a software deployment system may link code packages to computing devices where the packages are intended to run; metadata capturing such relationships may be acquired and used to generate an edge between a code package and a device in the graph(s) 1125.

The ETL tools may vary across different services or subsystems of the enterprise 1185, such as different package management systems, database services, network-accessible or "cloud-based" storage services, application environments, containerization systems, and so on.

In one embodiment, the graph(s) may be built initially based on user input, e.g., as captured using one or more tools for manual relationship graphing 1190. For example, the graphing tool(s) 1190 may permit developers to manually draw relationships between components of a software product in a graphical user interface. In one embodiment, the graphing tool(s) 1190 may include the software design diagrammer 100 as discussed above, and the design diagrammer 100 may produce design diagrams with remediation of ambiguous elements and other flaws. However, such user-supplied diagrams may be incorrect or inaccurate (even after disambiguation) or may become outdated at some point during the lifecycle of the software product. In one embodiment, to reduce or even eliminate such human error, the user-supplied initial graph may be modified, corrected, and/or augmented using the automated relationship analysis 1110. In one embodiment, the user tool(s) 1190 for describing application architectures and the tool for automated relationship analysis 1110 may use a similar or identical set of terms for application types, relationship types, datatypes, and so on, in order to facilitate the use of the user-supplied information for automated graph building. In one embodiment, all or part of the graph(s) 1125 may be vended back to the graphing tool(s) 1190 for visualization to users and/or to solicit further user input regarding the graph.

In one embodiment, the graph(s) 1125 may include metadata for individual nodes and edges, and the metadata may indicate unique node identifiers, unique edge identifiers, node types, edge types, and so on. Using such metadata, each node and/or edge may be uniquely identified in the graph(s) 1125. In one embodiment, additional metadata may be stored outside of the graph(s) 1125, e.g., in a storage service at a location or key associated with a node or edge in a graph itself. For example, contact information for an owner of a node may be stored external to the graph(s) 1125, e.g., in a database or storage service, and such information may be retrievable using a key or other identifier stored within the graph.

Using the event receipt component 1140, events 1135 may be received over time. Receipt of an event may trigger the updating of the graph(s) 1125. Receipt of an event may trigger automated threat analysis for a portion of the graph(s) 1125. An event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by elements of the enterprise 1185, such as software development environments in which program code is managed or ETL tools associated with various subsystems or services of the enterprise. An event may include data such as identifiers of one or more affected software components or relationships that correspond to nodes or edges in the graph. The threat modeler 1100 may subscribe to events for changed software products and new rules, e.g., via an event streaming service. Events may be received repeatedly and at different times after the graph(s) 1125 are built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

Using the graph updater 1130, the graph(s) 1125 may be modified based (at least in part) on an event. The affected nodes or edges may be identified by comparing the graph metadata (e.g., the unique identifiers of nodes and edges) to the information in the event. In modifying the graph(s) 1125, the graph updater 1130 may add one or more nodes, add one or more edges, remove one or more nodes, remove one or more edges, modify the metadata for one or more nodes, modify the metadata for one or more edges, and/or update the graph(s) in any other suitable manner. For example, if the event indicates that the program code has been updated to store data having a particular datatype in a particular location in a storage service, the threat modeler may add a node for that storage service (with metadata indicating the particular location) and a directed edge connecting the software product to the storage service. As another example, the graph metadata for the updated portion of the graph(s) may be modified to indicate the datatypes of source data and/or destination data for a new relationship. In one embodiment, the graph(s) 1125 may be updated by using one or more ETL (Extract, Transform, Load) tools to extract relevant data from a service or subsystem associated with the affected node(s) and then using that extracted data to modify particular elements of the graph(s).

As discussed above, the graph(s) may capture a complex web of intra-application and inter-application relationships in an enterprise, such that different portions of the graph(s) (sub-graphs) may represent different applications or services. Using the component for sub-graph traversal 1150, a sub-graph 1126 associated with an event may be identified in the graph(s) 1125. In one embodiment, the sub-graph 1126 may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

Using the component for sub-graph traversal 1150, threat modeling may be performed on the sub-graph 1126. In one embodiment, as shown in FIG. 11A, the threat modeling may be performed using one or more rules engines 1160. A rules engine may apply one or more rules 1165 to metadata associated with nodes and edges of the sub-graph 1126 to determine whether security threats or vulnerabilities are present in those nodes or edges. In one embodiment, as shown in FIG. 11B, the threat modeling may be performed using one or more analyzers 1161. Using metadata associated with nodes and edges of the sub-graph 1126, an analyzer may determine whether the sub-graph is in compliance with one or more policies 1162. In one embodiment, the analyzer(s) 1161 may include one or more rules engines. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph 1125 for an enterprise 1185 may be large and complex, and the use of micro-traversal of a sub-graph 1126 may permit the threat modeling to be performed efficiently and in a focused manner. In one embodiment, the sub-graph traversal 1150 may implement generational graph traversal in which interested consumers (e.g., rules engines or analyzers) minimize graph operations (e.g., obtaining edges for a vertex or obtaining paths from one vertex to another vertex) by piggybacking on a single graph operation and exposing the results to a set of consumers.

The rules 1165 for the rules engine(s) 1160 may be written by developers to detect particular security threats. The policies 1162 may be developed by users to determine whether software products are in compliance with best practices, e.g., to protect against security threats and vulnerabilities. In one embodiment, a main rules engine or analyzer may be used for common threats, and additional rules engines or analyzers may be added to detect new threats, uncommon threats, and/or threats requiring more complex analysis. In applying a rule to a sub-graph, metadata about nodes and edges may be extracted from the graph(s) and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

For a given sub-graph and a given rule, the sub-graph traversal 1150 may determine whether or not a security threat or vulnerability is present in a software product or software component. A particular rule may dictate whether a threat or vulnerability is present based (at least in part) on the elements of the rule as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule may determine that the node represents a security threat. Similarly, the sub-graph traversal 1150 may dictate whether component(s) of the sub-graph 1126 are in compliance with a particular policy, e.g., based (at least in part) on the elements of the policy as applied to the metadata associated with nodes and edges of the sub-graph.

A threat notifier 1170 may generate and send notifications 1175 of security threats that are identified using the automated threat modeling. Using the threat notifier 1170, if a threat is found, then an owner or manager associated with the affected node may be notified about the threat. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule that was violated. A notification may indicate data such as a name or identifier of the insecure node or relationship, a name or description of the rule that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat. Mitigation of a security threat may include modifying the program code of a software product, modifying the configuration of a software product, modifying a relationship between two components, and so on.

In one embodiment, the threat notifier 1170 may send notifications 1175 to one or more automated processes. The automated processes may in turn send metadata to additional automated processes, and so on, for additional analysis. Ultimately a user may be notified as discussed above. In this manner, a pipeline of processes may collaborate to create a holistic view of problems in the enterprise 1185 and provide more details to users.

Figure 12:
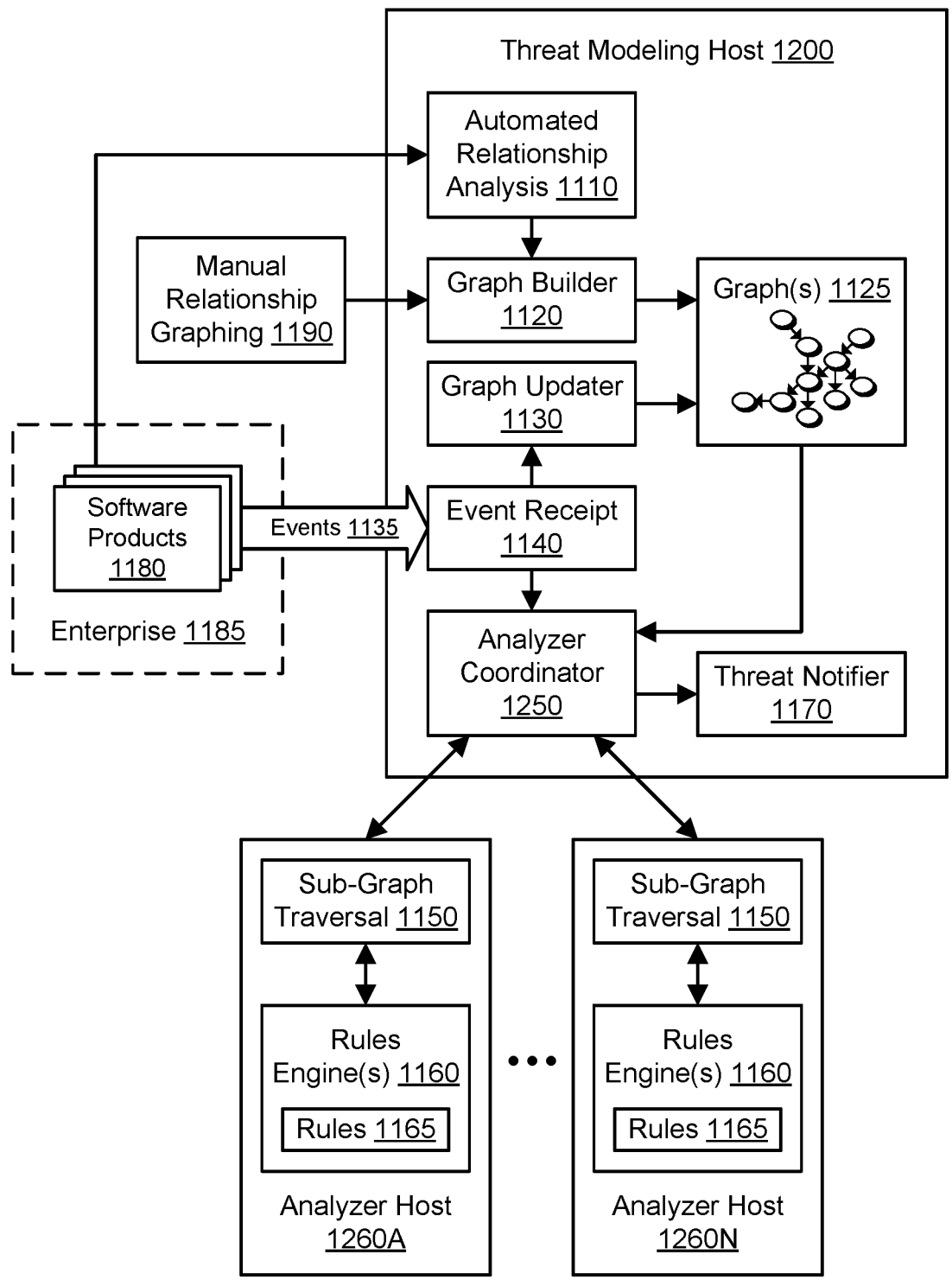
FIG. 12 illustrates further aspects of the example system environment for automated threat modeling using application relationships, including the use of a fleet of hosts to perform sub-graph traversal using one or more rules engines, according to some embodiments.

FIG. 12 illustrates further aspects of the example system environment for automated threat modeling using application relationships, including the use of a fleet of hosts to perform sub-graph traversal using one or more rules engines, according to one embodiment. In one embodiment, one or more threat modeling hosts such as host 1200 may implement aspects of the threat modeler 1100. For example, threat modeling host 1200 may implement the automated relationship analysis 1110, graph builder 1120, graph updater 1130, event receipt 1140, and threat notifier 1170. In one embodiment, a fleet of analyzer hosts 1260A-1260N may implement sub-graph traversal 1150 using the rules engine(s) 1160 or analyzer(s) 1161. Although analyzer hosts 1260A through 1260N are shown for purposes of illustration and example, it is contemplated that any suitable number and configuration of analyzer hosts may be used. In one embodiment, the various analyzer hosts 1260A-1260N may employ the same one or more rules engines 1160 and the same rules 1165 across the fleet of hosts. In one embodiment, the various analyzer hosts 1260A-1260N may employ different rules engines or rules across the fleet of hosts. In some embodiments, the analyzer hosts 1260A-1260N may employ analyzers 1161 other than rules engines, e.g., to determine policy compliance of software products.

The threat modeling host 1200 may include an analyzer coordinator 1250 that coordinates the analyzer hosts 1260A-1260N. In one embodiment, the analyzer coordinator 1250 may send commands to individual analyzer hosts in order to cause the individual hosts to perform sub-graph traversal for particular sub-graphs. In one embodiment, the analyzer coordinator 1250 may then receive results of the sub-graph traversal from the individual analyzer hosts. The result of sub-graph traversal for a particular sub-graph and rule may indicate data such as whether a rule was matched in the sub-graph, the name and/or description of any rule that was matched, the component(s) affected by the matched rule, and any other information usable to mitigate threats that are identified. The result of sub-graph traversal for a particular sub-graph and policy may indicate data such as whether a policy was violated in the sub-graph, the name and/or description of any policy that was violated, the component(s) affected by the violated policy, and any other information usable to mitigate threats that are identified.

In one embodiment, the analyzer coordinator 1250 may select or modify the number of analyzer hosts 1260A-1260N to meet the current processing needs of the threat modeling process. For example, the analyzer coordinator 1250 may scale up the number of analyzer hosts as more events are received or scale down the number of analyzer hosts as fewer events are received. As another example, the analyzer coordinator 1250 may scale up the number of analyzer hosts as host metrics exceed a performance or usage threshold or scale down the number of analyzer hosts as host usage metrics drop below a performance or usage threshold. In one embodiment, the analyzer coordinator 1250 may interact with a resource manager of a provider network in order to select, provision, configure, and/or deprovision hosts. For example, the resource manager may respond to a request from the analyzer coordinator 1250 by reserving a particular set of hosts from a pool of available hosts. Similarly, the resource manager may deprovision and return surplus hosts to the pool of available hosts, e.g., for use by other services.

The threat modeler 1100 and hosts 1200 and 1260A-1260N may be implemented using any suitable number and configuration of computing devices, any of which may be implemented by the example computing device 3000 illustrated in FIG. 16. The computing devices may be located in any suitable number of data centers or geographical locations. In various embodiments, at least some of the functionality of the threat modeler 1100 may be provided by the same computing device or by different computing devices. If any of the components of the threat modeler 1100 are implemented using different computing devices, then the components and their respective computing devices may be communicatively coupled, e.g., via one or more networks. Each of the components of the threat modeler 1100 may represent any combination of software and hardware usable to perform their respective functions, as discussed as follows. Operations implemented by the threat modeler 1100 may be performed automatically, e.g., without a need for user initiation or user intervention after an initial configuration stage, and programmatically, e.g., by execution of program instructions on at least one computing device. It is contemplated that the threat modeler 1100 and hosts 1200 and 1260A-1260N may include additional components not shown, fewer components than shown, or different combinations, configurations, or quantities of the components shown.

The threat modeler 1100 and hosts 1200 and 1260A-1260N may be implemented in a service-oriented system in which multiple services collaborate according to a service-oriented architecture. In such an environment, the threat modeler 1100 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the threat modeler 1100. To enable clients to invoke its functionality, the threat modeler 1100 may expose any suitable interface(s), such as one or more APIs or other programmatic interfaces and/or graphical user interfaces (GUIs). In one embodiment, the functionality of the threat modeler 1100 may be offered to clients in exchange for fees.

Components of the enterprise 1185, such as ETL tools that provide information about software products and their relationships, may convey network-based service requests to the threat modeler 1100 via one or more networks. In various embodiments, the network(s) may encompass any suitable combination of networking hardware and protocols necessary to establish network-based communications between the enterprise 1185 and the threat modeler 1100. For example, the network(s) may generally encompass the various telecommunications networks and service providers that collectively implement the Internet. The network(s) may also include private networks such as local area networks (LANs) or wide area networks (WANs) as well as public or private wireless networks. For example, both the software products 1180 (and associated ETL tools) and the threat modeler 1100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the enterprise 1185 and the Internet as well as between the Internet and the threat modeler 1100. It is noted that in some embodiments, the enterprise 1185 may communicate with the threat modeler 1100 using a private network rather than the public Internet.

In one embodiment, aspects of the threat modeler 1100 and hosts 1200 and 1260A-1260N may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 13A:
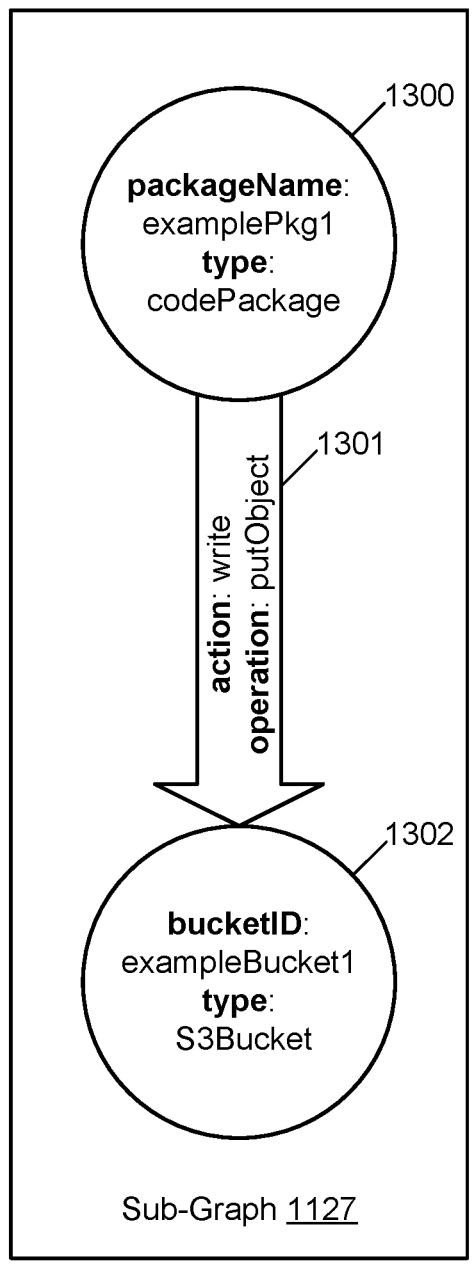
FIG. 13A and FIG. 13B illustrate example sub-graphs usable for automated threat modeling, according to some embodiments.
Figure 13B:
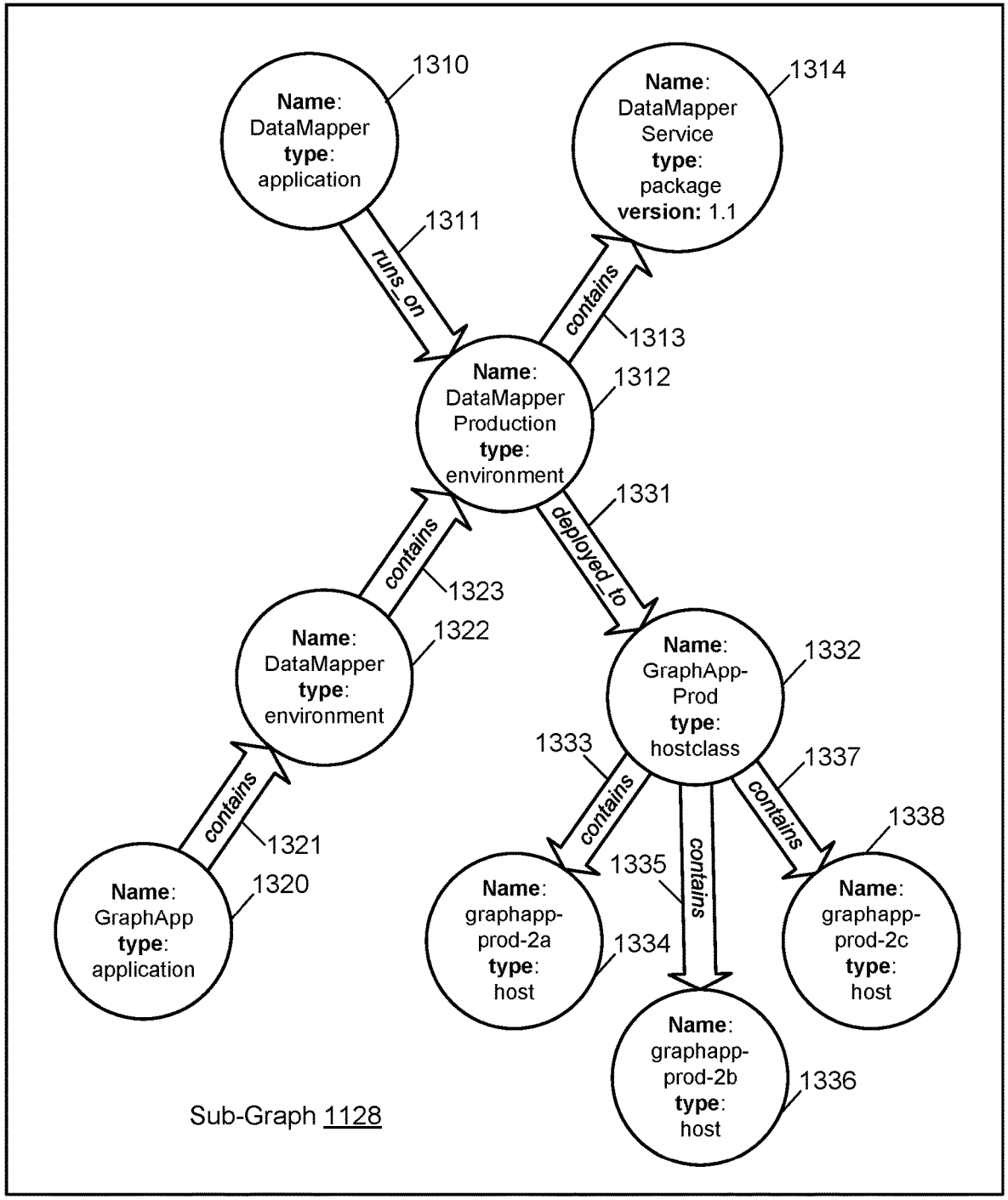

FIG. 13A and FIG. 13B illustrate example sub-graphs usable for automated threat modeling, according to some embodiments. FIG. 13A shows an example sub-graph 1127 with two nodes 1300 and 1302 and one edge 1301. Node 1300 may represent a particular code package that makes putObject requests to write to a specific storage object (e.g., a bucket in a storage service). Node 1300 may include metadata describing the package name ("examplePkg1") and the component type ("codePackage"). Node 1302 may represent the destination storage object and include metadata describing the bucket identifier ("exampleBucket1") and the component type ("S3Bucket"). A directed edge 1301 may represent the relationship between the two nodes and may include metadata describing the action ("write") and specific operation ("putObject"). In one embodiment, the terms in the graph metadata may be used consistently throughout the entire graph 1125, e.g., such that the same types of components have consistent component type descriptions and the same types of actions have consistent descriptions.

The sub-graph 1127 may be built or augmented using the graph builder 1120 based (at least in part) on automated relationship analysis 1110. In response to an event that involves examplePkg1 or exampleBucket1 or the write action between them, the sub-graph 1127 may be updated and then subjected to automated threat modeling using sub-graph traversal. For example, if the access control policy for exampleBucket1 has been modified (as indicated by an event), then the sub-graph 1127 may be reviewed using the rules engine(s) 1160 to determine whether any security vulnerabilities have been introduced by the change.

FIG. 13B shows an example sub-graph 1128 associated with a DataMapperService and related components. Each node (vertex) may include a component type as well as one or more uniquely identifying attributes such as a name, a version, and so on. Using the type combined with the uniquely identifying attribute(s), each node in the graph(s) 1125 may be uniquely and deterministically identifiable. By ensuring that each node is uniquely identifiable, the threat modeler 1100 may accurately identify the relevant sub-graph for a given event. Each edge in a graph may be associated with two nodes, may have a direction, and may have a label that generally describes the relationship. In the example sub-graph 1128, a node 1310 may represent an application named DataMapper. An edge 1311 may indicate that node 1310 runs on a node 1312 representing an execution environment named DataMapperProduction. An edge 1313 may indicate that the node 1312 contains a package named DataMapperService having a version number of 1.1. A node 1320 may represent another application 1320 named GraphApp. A node 1322 may represent another environment named DataMapper. An edge 1321 may indicate that node 1320 contains node 1322, and an edge 1323 may indicatye that node 1322 contains node 1312. Node 1312 may be deployed to a hostclass named GraphApp-Prod as represented by node 1332 and edge 1331. The hostclass node 1322 may contain three individual named hosts (graphapp-prod-2a, graphapp-prod-2b, and graphapp-prod-2c) as indicated by nodes 1334, 1336, and 1338 and edges 1333, 1335, and 1336.

The sub-graph 1128 may be built or augmented using the graph builder 1120 based (at least in part) on automated relationship analysis 1110. In response to an event that involves any of the applications, environments, packages, hostclass, or hosts shown in FIG. 13B, the sub-graph 1128 may be updated and then subjected to automated threat modeling using sub-graph traversal. For example, if the access credentials for the graphapp-prod-2b host have been modified (as indicated by an event), then all or part of the sub-graph 1128 may be reviewed using the rules engine(s) 1160 to determine whether any security vulnerabilities have been introduced by the change. As another example, if a different version of the DataMapperService package (represented by node 1312) is deployed to replace version 1.1, then all or part of the sub-graph may be reviewed using the rules engine(s) 1160 to determine whether any security vulnerabilities have been introduced by the change.

Figure 14:
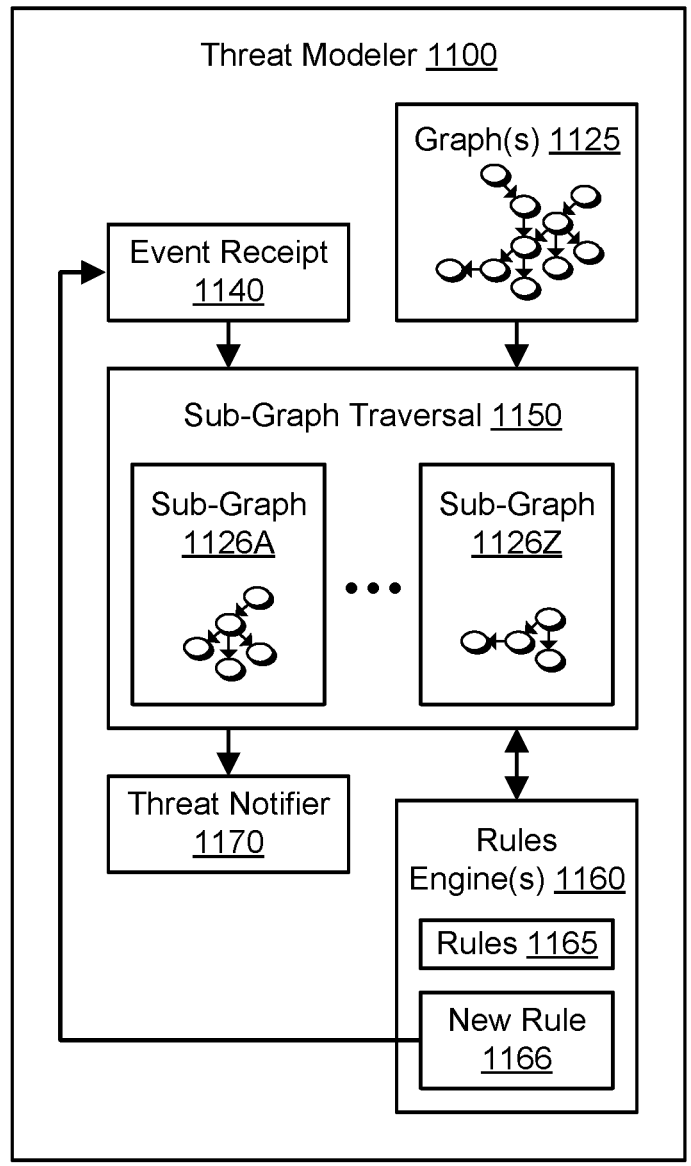
FIG. 14 illustrates further aspects of the example system environment for automated threat modeling using application relationships, including the addition of a new rule to a rules engine as a trigger for automated threat modeling of multiple sub-graphs, according to some embodiments.

FIG. 14 illustrates further aspects of the example system environment for automated threat modeling using application relationships, including the addition of a new rule to a rules engine as a trigger for automated threat modeling of multiple sub-graphs, according to one embodiment. In one embodiment, an event received by the event receipt component 1140 may be indicative of a new rule 1166 added to a rules engine used for threat modeling. The new rule 1166 may represent a modification to a prior rule or may instead represent an entirely new rule, e.g., to detect a newly discovered security threat or vulnerability. In one embodiment, an event received by the event receipt component 1140 may be indicative of a new policy added to an analyzer used for threat modeling. In one embodiment, the threat modeler 1100 may seek to review the entire graph 1126 (or large portions of the graph) with respect to the new rule or new policy. Accordingly, the threat modeler 1100 may perform sub-graph traversal for threat analysis using the new rule 1166 or new policy for a plurality of sub-graphs 1126A-1126Z. In order to use computing resources efficiently for a large enterprise with a large number of sub-graphs, the threat modeler may roll out the new rule or new policy to various sub-graphs 1126A-1126Z over hours, days, or even weeks. As discussed above, the threat modeler 1100 may generate notifications to interested parties (including users and/or automated systems) using the threat notifier 1170 if any software components are found to match the new rule 1166 or to violate the new policy. Matching a rule may represent a violation of a policy for security best practice and may result in a finding that a software component represents a security threat or vulnerability.

Figure 15:
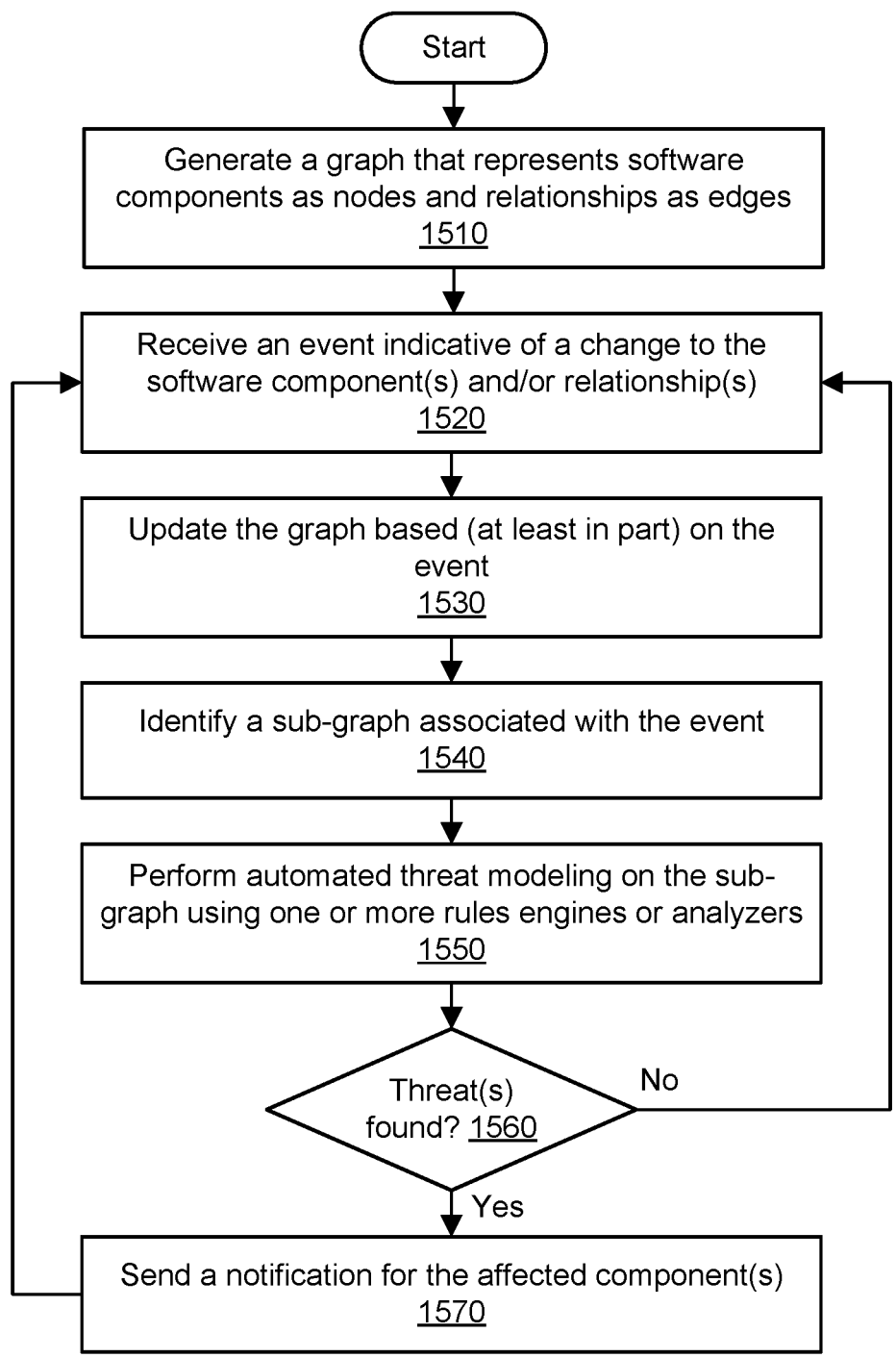
FIG. 15 is a flowchart illustrating a method for automated threat modeling using application relationships, according to some embodiments.

FIG. 15 is a flowchart illustrating a method for automated threat modeling using application relationships, according to one embodiment. As shown in 1510, a graph may be generated. The graph may include a plurality of nodes representing software components and a plurality of edges represent relationships between software components. The edges may include directed edges. In one embodiment, the graph may be a directed acyclic graph. The relationships may include relationships between components of a single application and/or relationships from one application to another application. For example, two connected nodes may represent an application and a storage object in a storage service, and the edge between the nodes may represent that the application stores data in that storage object. The graph may capture a complex web of intra-application and inter-application relationships in an enterprise, such that different portions of the graph (sub-graphs) may represent different applications or services. For a sufficiently large enterprise, the enterprise-wide graph may include vast numbers of nodes.

In one embodiment, the graph may be built using automated techniques such as static code analysis and/or dynamic (runtime) analysis. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph may be built initially based on user input (e.g., using one or more tools that permit users to describe application architectures) and then modified and/or corrected using the automated techniques to reduce human error. In one embodiment, the user tool(s) for describing application architectures and the tool for automated graph building may use a similar or identical set of terms for application types, relationship types, datatypes, and so on, in order to facilitate the use of the user-supplied information for automated graph building. In one embodiment, the graph may include metadata for individual nodes and edges, and the metadata may indicate unique node identifiers, unique edge identifiers, node types, edge types, and so on. Using such metadata, each node and/or edge may be uniquely identified in the graph. In one embodiment, additional metadata may be stored outside of the graph, e.g., in a storage service at a location or key associated with a node or edge in the graph itself.

As shown in 1520, an event may be received, e.g., by a threat modeler. The event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by software development environments. An event may include data such as one or more affected software components or relationships that correspond to nodes or edges in the graph. The affected nodes or edges may be identified by comparing the graph metadata (e.g., the unique identifiers of nodes and edges) to the information in the event. In one embodiment, the event may be indicative of a new rule added to a rules engine used for threat modeling. The threat modeler may subscribe to events for changed software products and new rules, e.g., via an event streaming service. Events may be received repeatedly and at different times after the graph is built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

As shown in 1530, the graph may be modified based (at least in part) on the event. In modifying the graph, the threat modeler may add one or more nodes, add one or more edges, remove one or more nodes, remove one or more edges, modify the metadata for one or more nodes, modify the metadata for one or more edges, and/or update the graph in any other suitable manner. For example, if the event indicates that the program code has been updated to store a particular datatype in a particular location in a storage service, the threat modeler may add a node for that storage service (with metadata indicating the particular location) and a directed edge connecting the software product to the storage service. As another example, the graph metadata for the updated portion of the graph may be modified to indicate the datatypes of source data and destination data for a new relationship. In one embodiment, the graph may be updated by using one or more ETL (Extract, Transform, Load) tools to extract relevant data from a service or subsystem associated with the affected node(s) and then using that extracted data to modify particular elements of the graph.

As discussed above, the graph may capture a complex web of intra-application and inter-application relationships in an enterprise, such that different portions of the graph (sub-graphs) may represent different applications or services. As shown in 1540, a sub-graph associated with the event may be identified in the graph. In one embodiment, the sub-graph may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

As shown in 1550, threat modeling may be performed on the sub-graph. In one embodiment, the threat modeling may be performed using one or more rules engines or analyzers. A rules engine may apply one or more rules to metadata associated with nodes and edges of the sub-graph to determine whether security threats or vulnerabilities are present in those nodes or edges. An analyzer may determine whether one or more policies are met or violated by the nodes and edges of the sub-graph. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph for an enterprise may be large and complex, and the use of micro-traversal of a sub-graph may permit the threat modeling to be performed efficiently and in a focused manner. The rules or policies may be written by developers to detect particular security threats and/or compliance with best practices. In one embodiment, a main rules engine or analyzer may be used for common threats, and additional rules engines or analyzers may be added to detect new or uncommon threats. In applying a rule to a sub-graph, metadata about nodes and edges may be extracted from the graph and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

As shown in 1560, the method may determine whether a security threat or vulnerability is present in the software product or whether the software product complies with (or instead violates) applicable policies. A particular rule or policy may dictate whether a threat or vulnerability is present based (at least in part) on the elements of the rule or policy as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule or policy may determine that the node represents a security threat and/or violates a best practice.

As shown in 1570, if a threat or instance of policy noncompliance is found, then an owner or manager associated with the affected node may be notified about the threat or noncompliance. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule or policy that was violated. A notification may indicate data such as a name or identifier of the insecure node or relationship, a name or description of the rule or policy that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat.

Illustrative Computer System

In at least some embodiments, a computer system that implements a portion or all of one or more of the technologies described herein may include a computer system that includes or is configured to access one or more computer-readable media. FIG. 16 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 16 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more processors and one or more memories to store computer-executable instructions that, if executed, cause the one or more processors to:
        determine one or more graphs representing a plurality of elements of a software design diagram, wherein the software design diagram is generated using input to a user interface, wherein the one or more graphs comprise a plurality of nodes representing software components and a plurality of edges representing relationships between the software components, and wherein the plurality of elements are positioned in the software design diagram at respective spatial coordinates on a two-dimensional plane;
        initiate, by a rules engine, an evaluation of the software design diagram with respect to one or more rules, wherein the evaluation is based at least in part on the one or more graphs and the respective spatial coordinates, wherein the one or more graphs are traversed in the evaluation;
        identify, based at least in part on the evaluation, one or more ambiguous elements of the plurality of elements of the software design diagram;
        generate a modified software design diagram representing disambiguation of at least a portion of the one or more ambiguous elements; and
        based at least in part on the identification of the one or more ambiguous elements, send a notification regarding a software design associated with the software design diagram, perform a remediation of the software design, or perform an autocorrection of the software design to remediate one or more flaws in the software design.

2. The system as recited in claim 1, wherein the one or more ambiguous elements comprise one or more ambiguous relationships between ones of the software components, and wherein the disambiguation comprises disambiguation of the one or more ambiguous relationships.

3. The system as recited in claim 1, wherein the one or more ambiguous elements comprise an edge connected to only one of the software components, and wherein the disambiguation comprises removal of the edge.

4. The system as recited in claim 1, wherein the one or more ambiguous elements comprise a lack of configuration information associated with one of the components or relationships, and wherein the disambiguation comprises addition of the configuration information.

5. A method, comprising:
    determining one or more graphs representing a plurality of elements of a design diagram, wherein the one or more graphs comprise a plurality of nodes representing components and a plurality of edges representing relationships between the components;
    initiating, by a rules engine, an evaluation of the design diagram with respect to one or more rules, wherein the evaluation is based at least in part on traversal of the one or more graphs;
    identifying, based at least in part on the evaluation, one or more flaws in the design diagram;
    generating a modified design diagram representing remediation of at least a portion of the one or more flaws; and
    sending a notification regarding a software design associated with the software design diagram, performing a remediation of the software design, or performing an autocorrection of the software design, based at least in part on the identified one or more flaws in the design diagram to remediate one or more flaws in the software design.

6. The method as recited in claim 5, further comprising:
    deriving, from the design diagram, respective spatial information for at least a portion of the elements, wherein the evaluation is based at least in part on the respective spatial information.

7. The method as recited in claim 5, wherein the modified design diagram is generated using one or more autocorrections performed without input to a user interface, wherein the one or more autocorrections are associated with one or more matched rules determined by the evaluation.

8. The method as recited in claim 5, wherein the modified design diagram is generated responsive to input to a user interface, wherein the input represents acceptance of one or more remedial actions presented in the user interface, and wherein the one or more remedial actions are associated with one or more matched rules determined by the evaluation.

9. The method as recited in claim 5, wherein the one or more flaws comprise one or more ambiguous relationships between ones of the components, and wherein the remediation comprises disambiguation of the one or more ambiguous relationships.

10. The method as recited in claim 5, wherein the one or more flaws comprise an edge connected to only one of the components, and wherein the remediation comprises removal of the edge.

11. The method as recited in claim 5, wherein the one or more flaws comprise a lack of configuration information associated with one of the components, and wherein the remediation comprises addition of the configuration information.

12. The method as recited in claim 5, further comprising:
   determining one or more modified graphs representing the modified design diagram; and
   performing an additional evaluation of the one or more modified graphs using a threat analyzer, wherein the additional evaluation determines whether one or more security vulnerabilities are present in the one or more modified graphs.

13. One or more non-transitory computer-readable storage media storing program instructions that, when executed on or across one or more processors, perform:
   determining one or more graphs representing a plurality of elements of a design diagram, wherein the one or more graphs comprise a plurality of nodes representing software components and a plurality of edges representing relationships between the software components;
   initiating, by a rules engine, an evaluation of the design diagram with respect to one or more rules, wherein the evaluation is based at least in part on traversal of the one or more graphs;
   identifying, based at least in part on the evaluation, one or more ambiguities in the software design diagram;
   generating a modified design diagram representing remediation of at least a portion of the one or more ambiguities; and
   sending a notification regarding a software design associated with the software design diagram, performing a remediation of the software design, or performing an autocorrection of the software design, based at least in part on the identified one or more ambiguities in the software design diagram to remediate one or more flaws in the software design.

14. The one or more non-transitory computer-readable storage media as recited in claim 13, wherein the program instructions, when executed on or across the one or more processors, perform:
   extracting, from the design diagram, respective spatial coordinates for at least a portion of the elements, wherein the evaluation is based at least in part on the respective spatial coordinates.

15. The one or more non-transitory computer-readable storage media as recited in claim 13, wherein the modified design diagram is generated using one or more autocorrections performed without input to a user interface, wherein the one or more autocorrections are associated with one or more matched rules determined by the evaluation.

16. The one or more non-transitory computer-readable storage media as recited in claim 13, wherein the modified design diagram is generated responsive to input to a user interface, wherein the input represents acceptance of one or more recommended remedial actions, and wherein the one or more recommended remedial actions are associated with one or more matched rules determined by the evaluation.

17. The one or more non-transitory computer-readable storage media as recited in claim 13, wherein the one or more ambiguities comprise one or more ambiguous relationships between ones of the software components, and wherein the remediation comprises disambiguation of the one or more ambiguous relationships.

18. The one or more non-transitory computer-readable storage media as recited in claim 13, wherein the one or more ambiguities comprise an edge connected to only one of the software components, and wherein the remediation comprises removal of the edge.

19. The one or more non-transitory computer-readable storage media as recited in claim 13, wherein the one or more ambiguities comprise a lack of configuration information associated with one of the software components, and wherein the remediation comprises addition of the configuration information.

20. The one or more non-transitory computer-readable storage media as recited in claim 13, wherein the program instructions, when executed on or across the one or more processors, perform:
   determining one or more modified graphs representing the modified design diagram; and
   performing an additional evaluation of the one or more modified graphs using a policy compliance analyzer, wherein the additional evaluation determines whether the one or more modified graphs comply with one or more policies.

* * * * *